United States Patent
Lau et al.

(10) Patent No.: US 10,394,583 B2
(45) Date of Patent: Aug. 27, 2019

(54) AUTOMATED MODEL GENERATION FOR A SOFTWARE SYSTEM

(71) Applicant: CA, Inc., Islandia, NY (US)

(72) Inventors: Rich J. Lau, Deer Park, NY (US); Bing Li, Plainview, NY (US)

(73) Assignee: CA, Inc., Islandia, NY (US)

( * ) Notice: Subject to any disclaimer, the term of this patent is extended or adjusted under 35 U.S.C. 154(b) by 94 days.

(21) Appl. No.: 15/087,450

(22) Filed: Mar. 31, 2016

(65) Prior Publication Data

US 2017/0286277 A1    Oct. 5, 2017

(51) Int. Cl.
| | |
|---|---|
| *G06F 9/455* | (2018.01) |
| *G06F 11/30* | (2006.01) |
| *G06F 11/34* | (2006.01) |
| *G06F 11/36* | (2006.01) |
| *H04L 12/26* | (2006.01) |
| *G06F 8/20* | (2018.01) |
| *G06F 8/70* | (2018.01) |
| *G06F 8/30* | (2018.01) |

(52) U.S. Cl.
CPC .............. *G06F 9/455* (2013.01); *G06F 8/20* (2013.01); *G06F 8/70* (2013.01); *G06F 11/30* (2013.01); *G06F 11/3466* (2013.01); *G06F 11/3608* (2013.01); *G06F 11/3684* (2013.01); *G06F 11/3696* (2013.01); *H04L 43/00* (2013.01); *G06F 8/30* (2013.01)

(58) Field of Classification Search
None
See application file for complete search history.

(56) References Cited

U.S. PATENT DOCUMENTS

| | | | |
|---|---|---|---|
| 5,345,587 | A  | 9/1994 | Fehskens et al. |
| 5,450,586 | A  | 9/1995 | Kuzara et al. |
| 5,576,965 | A  | 11/1996 | Akasaka et al. |
| 6,122,627 | A  | 9/2000 | Carey et al. |
| 6,134,540 | A  | 10/2000 | Carey et al. |
| 6,810,368 | B1 | 10/2004 | Pednault |
| 6,879,946 | B2 | 4/2005 | Rong et al. |

(Continued)

OTHER PUBLICATIONS

Wikipedia, "Mock Object," Sep. 23, 2008, printed May 31, 2009, pp. 1-5.

(Continued)

*Primary Examiner* — Francisco J Aponte
*Assistant Examiner* — Mark A Gooray
(74) *Attorney, Agent, or Firm* — Alliance IP, LLC

(57) ABSTRACT

Transaction data is accessed that has been generated from monitoring of a plurality of transactions in a system that includes a plurality of software components. The transaction data is assessed to identify that a particular one of the plurality of transactions meets a particular one of a set of conditions based on an attribute of the particular transaction. A portion of the transaction data describing the particular transaction is selected based on the particular transaction meeting the particular condition. A model of a particular one of the software components involved in the particular transaction is generated using the selected portion of the transaction data. The model is used to launch a computer-implemented simulation of the particular software component within subsequent transactions of the system.

20 Claims, 13 Drawing Sheets

(56) References Cited

U.S. PATENT DOCUMENTS

| | | | |
|---|---|---|---|
| 6,883,162 B2 | 4/2005 | Jackson et al. | |
| 6,957,199 B1 | 10/2005 | Fisher | |
| 7,376,549 B2 | 5/2008 | Horikawa | |
| 7,437,710 B2 | 10/2008 | Bau et al. | |
| 7,487,508 B2 | 2/2009 | Fu et al. | |
| 7,539,980 B1 | 5/2009 | Bailey et al. | |
| 7,552,036 B2 | 6/2009 | Oslake et al. | |
| 7,676,538 B2 | 3/2010 | Potter et al. | |
| 7,783,613 B2 | 8/2010 | Gupta et al. | |
| 7,805,496 B2 | 9/2010 | Aiber et al. | |
| 7,873,594 B2 | 1/2011 | Harada et al. | |
| 7,966,183 B1 | 6/2011 | Kryskow et al. | |
| 8,060,864 B1 | 11/2011 | Michelsen | |
| 8,112,262 B1 | 2/2012 | Michelsen | |
| 8,538,740 B2 | 9/2013 | Kumar et al. | |
| 8,898,681 B1 | 11/2014 | Acheff et al. | |
| 8,935,573 B2 | 1/2015 | Horsman et al. | |
| 9,015,668 B1* | 4/2015 | Michelsen | G06F 8/70 717/120 |
| 9,201,767 B1 | 12/2015 | Tarlton et al. | |
| 9,323,645 B2 | 4/2016 | Michelsen | |
| 9,531,609 B2 | 12/2016 | Talot et al. | |
| 2002/0010781 A1 | 1/2002 | Tuatini | |
| 2003/0055670 A1 | 3/2003 | Kryskow et al. | |
| 2003/0217162 A1 | 11/2003 | Fu et al. | |
| 2004/0078782 A1 | 4/2004 | Clement et al. | |
| 2004/0128259 A1 | 7/2004 | Blakeley et al. | |
| 2004/0162778 A1 | 8/2004 | Kramer et al. | |
| 2004/0230674 A1 | 11/2004 | Pourheidari et al. | |
| 2004/0243334 A1 | 12/2004 | Wrigley et al. | |
| 2004/0243338 A1 | 12/2004 | Sabiers et al. | |
| 2005/0027648 A1 | 2/2005 | Knowles et al. | |
| 2005/0063335 A1 | 3/2005 | Shenfield et al. | |
| 2005/0198401 A1 | 9/2005 | Chron et al. | |
| 2005/0289231 A1 | 12/2005 | Harada et al. | |
| 2006/0224375 A1 | 10/2006 | Barnett et al. | |
| 2006/0235675 A1 | 10/2006 | Oslake et al. | |
| 2007/0006177 A1 | 1/2007 | Aiber et al. | |
| 2007/0033442 A1 | 2/2007 | Tillmann et al. | |
| 2007/0073682 A1 | 3/2007 | Adar et al. | |
| 2007/0169003 A1 | 7/2007 | Branda et al. | |
| 2007/0261035 A1 | 11/2007 | Duneau | |
| 2007/0277158 A1 | 11/2007 | Li et al. | |
| 2008/0010074 A1 | 1/2008 | Brunswig et al. | |
| 2008/0120129 A1 | 5/2008 | Seubert et al. | |
| 2008/0127093 A1 | 5/2008 | Fernandez-Ivern et al. | |
| 2009/0064149 A1 | 3/2009 | Singh et al. | |
| 2009/0094684 A1 | 4/2009 | Chinnusamy et al. | |
| 2009/0119301 A1 | 5/2009 | Cherkasova et al. | |
| 2009/0187534 A1 | 7/2009 | Broll et al. | |
| 2009/0204669 A1 | 8/2009 | Allan | |
| 2009/0234710 A1 | 9/2009 | Hassine et al. | |
| 2009/0282403 A1 | 11/2009 | Poole et al. | |
| 2009/0298458 A1 | 12/2009 | Bakker et al. | |
| 2010/0037100 A1 | 2/2010 | Lopian | |
| 2010/0145962 A1 | 6/2010 | Chen et al. | |
| 2010/0318974 A1 | 12/2010 | Hrastnik et al. | |
| 2012/0059868 A1 | 3/2012 | Buckl et al. | |
| 2012/0084754 A1 | 4/2012 | Ziegler et al. | |
| 2014/0108589 A1 | 4/2014 | Dhanda | |
| 2014/0223418 A1* | 8/2014 | Michelsen | G06F 11/3696 717/135 |
| 2015/0205699 A1 | 7/2015 | Michelsen | |
| 2015/0205700 A1 | 7/2015 | Michelsen | |
| 2015/0205701 A1 | 7/2015 | Michelsen | |
| 2015/0205702 A1 | 7/2015 | Michelsen | |
| 2015/0205703 A1 | 7/2015 | Michelsen | |
| 2015/0205708 A1 | 7/2015 | Michelsen | |
| 2015/0205712 A1 | 7/2015 | Michelsen | |
| 2015/0205713 A1 | 7/2015 | Michelsen | |
| 2016/0125052 A1 | 5/2016 | Dahan et al. | |
| 2016/0239409 A1 | 8/2016 | de Oliveira Staudt et al. | |

OTHER PUBLICATIONS

Lisa, 2.0 User's Guide, Interactive TKO, Feb. 27, 2003, pp. 1-130.

Lisa, 2.0 Developer's Guide, Interactive TKO, Mar. 13, 2003, pp. 1-23.

Chapter 5—Service Discovery, Bluetooth Application Developer's Guide, 2002 (pp. 167-209).

Chatterjee, S., "Messaging Patterns in Service-Oriented Architecture, Part 1,", Apr. 2004, (pp. 1-21).

Time to live—Wikipedia, the free encyclopedia; 2015; pp. 1-3, examiner annotated document.

Web Discussion: "Is TCP protocol stateless or not?" pp. 1-3 (2013).

* cited by examiner

AUTOMATED MODEL GENERATION FOR A SOFTWARE SYSTEM

BACKGROUND

The present disclosure relates in general to the field of computer testing, and more specifically, to generating computer software tests.

Deployments of composite applications and systems are increasing. Composite applications and systems can include multiple different software components working in combination to deliver particular results or services. In some composite systems and applications, software components from a variety of different sources and developers can be combined and cooperatively function. While efficiencies and advantages have been realized in the development of software by employing composite components, testing of such systems can be complicated.

Test stubs have been developed to test operability of software systems for certain pre-defined scenarios. A wide variety of tests are utilized in connection with the development and maintenance of software systems. For instance, regression testing can be used to uncover new software bugs, or regressions, in components of a system. In another example, load testing can be used to test the response of a system to various load conditions, such as peak or spiking load conditions.

BRIEF SUMMARY

According to one aspect of the present disclosure, transaction data can be accessed that has been generated from monitoring of a plurality of transactions in a system that includes a plurality of software components. The transaction data can be assessed to identify that a particular one of the plurality of transactions meets a particular one of a set of conditions based on an attribute of the particular transaction. A portion of the transaction data describing the particular transaction can be selected based on the particular transaction meeting the particular condition. A model of a particular one of the software components involved in the particular transaction can be generated using the selected portion of the transaction data. The model can then used to launch a computer-implemented simulation of the particular software component within subsequent transactions of the system (or another system). Models can be operable to simulate responses and/or requests generated by the particular software component.

BRIEF DESCRIPTION OF THE DRAWINGS

Like reference numbers and designations in the various drawings indicate like elements.

DETAILED DESCRIPTION

Figure 1:
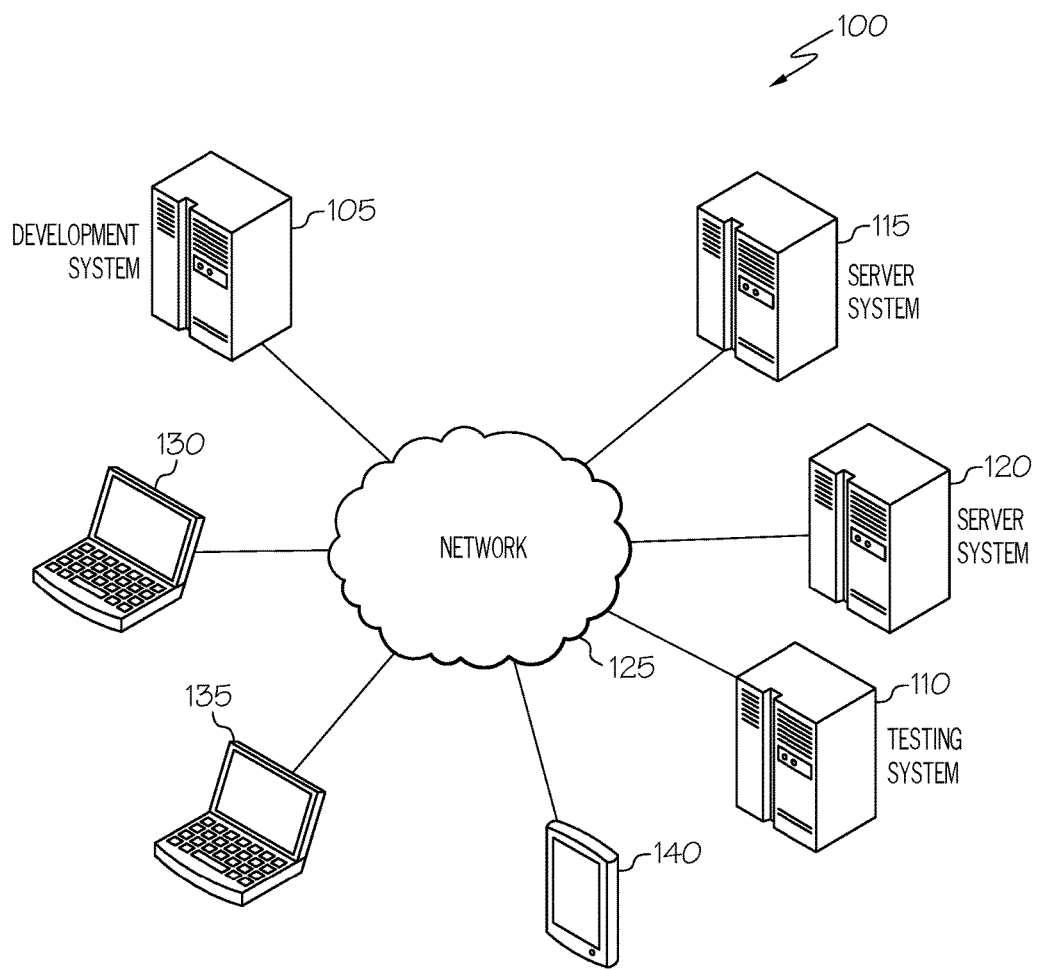
FIG. 1 is a simplified schematic diagram of an example computing system including an example software development system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a simplified block diagram illustrating an example computing system 100 including a software development system 105, a testing system 120, and one or more server system 115, 120 hosting applications, services, programs, and their constituent software components. In some implementations, functionality of the development system 105 and testing system 130, can be combined or even further divided and implemented among multiple different systems, among other example implementations.

The development system 105 can host a variety or suite of software development tools for use in performing various development tasks within the software development cycle of one or more components (e.g., hosted by one or both of server systems 115, 120). In some implementations, the development system 105 can include functionality for monitoring transactions involving production or pre-production (e.g., test, beta, or in-development) versions of various software components and systems. For instance, development system 105 can monitor transactions to determine transaction flow paths across multiple software components (e.g., within an application or across applications (and in some cases across servers 115, 120) in a multi-tiered or distributed software system). Further, development system 105 can identify particular characteristics of the transactions from the monitoring. Models of the transactions and the participating software components can be generated, in some instances, based on the monitoring of the transactions. Models can be provided in subsequent transactions to stand-in for "real" versions of the software components modeled by the models. Such models can, for example, model participation of a particular software component within a transaction flow including the generation of smart synthetic responses to responses it receives and/or generating synthetic requests of other software components in the transactions. Such synthetic request and responses can be generated such that receiving components believe the requests or responses arrive from the real version of the software component within the context of a particular transaction.

Models generated by a development system 105 can be stored in a library of models and can be used to facilitate further development tasks. For instance, a software component under development may be dependent on a third-party service that is not available to be used by the developer of the software component. Accordingly, the third-party service can be virtualized using a corresponding model and developers can develop against the virtualized version of the third-party service instead of the actual version of the service. In another examples, a testing system 110 can utilize models generated using the development system. For instance, models can be controlled or adapted by the testing system to simulate certain controlled conditions that are to be tested within a system. For instance, a model can generate requests of a certain type with particular request content and/or attributes to facilitate conditions under which one or more other software components of a system are to be tested. Dependencies can also be modeled using corresponding models, for instance, to provide a stand-in for an application, service, or other software component within a test (e.g., rather than subjecting the real version of the modeled software component to the test traffic), among other examples.

One or more computing systems and services can be hosted on machines communicatively coupled by one or more networks (e.g., 125), including local networks, public networks, wide area networks, broadband cellular networks, the Internet, and the like. Additionally, computing environment 100 can include one or more user devices (e.g., 130, 135, 140) that can allow users to interact with one or more of the tools, services, data structures, and services (e.g., hosted by systems 105, 110, 115, 120, etc.). User devices 130, 135, 140, in some cases, may be local to systems (e.g., 105, 110, 115, 120, etc.) hosting such resources, while, in other cases, may access these resources from remotely-located systems (e.g., using network 125), among other examples.

In general, "servers," "clients," "computing devices," "network elements," "hosts," "system-type system entities," "user devices," and "systems" (e.g., 105, 110, 115, 120, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 130, 135, 140, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a development system 105, testing system 110, service or application (e.g., hosted by a server system (e.g., 115, 120)) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditionally, testing and development of complex multi-tiered or distributed software systems often involved the construction of equally complex testing environments, which, in some cases, took weeks and hundreds of man hours to develop in order to perform integration testing, load testing, performance testing, and other tasks. Automated test development tools can be used to automatically build sophisticated and accurate models, which can be used to substantially reduce the work traditionally required to build a test environment. For instance, service virtualization, client simulators (or test cases), and other models can be generated from transaction data collected from automated, computer monitoring of transactions of a software system. However, automation tools can still involve human-performed workflows that slow the construction of test environments and models/simulators for use during software development. In some cases, developing a model, such as a test case or a virtual service can involve the provision of human user inputs and analysis that can slow the process of generating models for inclusion in a library of test cases and virtual services. For instance, in one example, to generate a test case corresponding to a particular transaction can include the configuration of one or more agents within a system used to perform the particular transaction and triggering the transaction(s) (e.g., through the construction and sending of a particular request with particular characteristics). A variety of transaction data can be generated from the particular transaction. In some cases, multiple other (and unrelated) transaction may also be triggered and executed by portions of the same system, resulting in additional transaction data being generated. To identify the transactions and corresponding transaction data of interest to the user (e.g., from which a test case or virtual service is to be generated), can involve manually sifting through a mass of recorded transactions. A subset of these transactions can be selected (e.g., through a user interface) and corresponding transaction data can be accessed by a development system to automatically generate one or models to model one or more of the software components participating in the selected transactions or transaction fragments. Further editing can be done to the generated models, for instance, to add additional features or modeled transactions beyond that captured during the monitoring. The test cases and/or virtual services can then be launched by the user. Filtering through the desired transactions and creating the models (in response to user inputs requesting the creation of the models) can present user-centered bottlenecks hindering the creation of large and robust model sets for a system, among other example issues.

Figure 2:
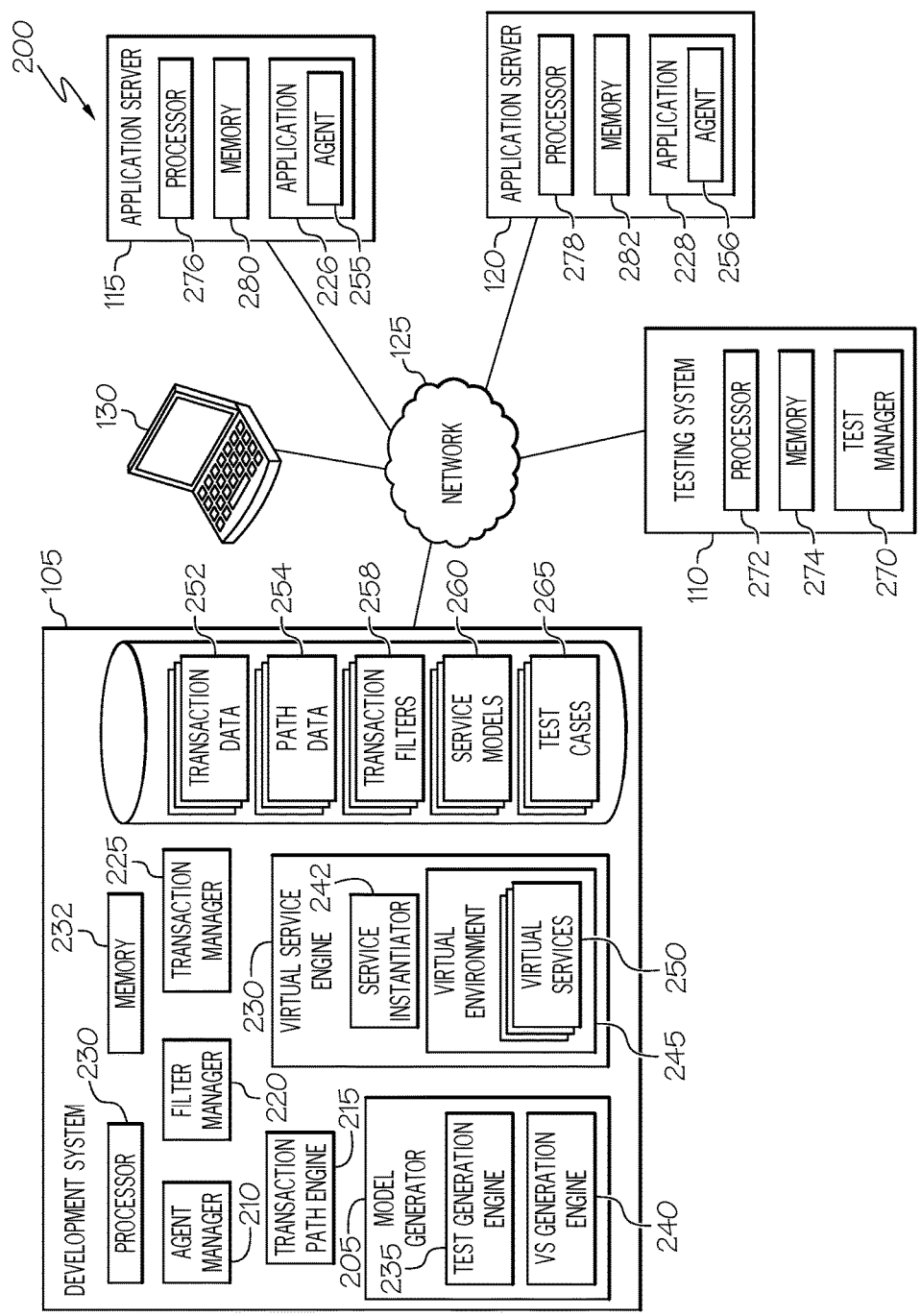
FIG. 2 is a simplified block diagram of an example computing system including an example software development system in accordance with at least one embodiment.

The example systems illustrated in FIGS. 1 and 2 may be provided with functionality to address at least some of the issues above among other example advantages. For instance, turning to FIG. 2, a system 200 can include an example development system 105, a testing system 110, and one or more systems 115, 120 hosting software applications, services, programs, applets, components, objects, or other software components (e.g., 226, 228). In one example, a development system 105 can include one or more data processing apparatus 230, one or more memory elements 232, and one or more components implemented in hardware and/or software such as one or more model generators 205, an agent manager 210, transaction path engine 215, filter manager 220, transaction manager 225, virtual service engine 230, among potentially other components as well as implementations including components combining or sub-dividing functionality of the example components shown and described in this example.

In one example, an agent manager 210 can be provided that interfaces with or otherwise manages one or more instrumentation agents (or "agents") (e.g., 255, 256) deployed on one or more applications (e.g., 226, 228) for use in aiding the monitoring of performance of the application or individual components of the applications (e.g., 226, 228), among other examples. Agents (e.g., 255, 256) can be software-implemented agents that are configured to provide visibility into the operations of each instrumented component (e.g., 226, 228, etc.). Agents (e.g., 255, 256) can be configured, for example, to detect requests and responses being sent to and from the component or application in which that agent is embedded. Additionally, each agent can be configured to detect and report on activity that occurs internal to the component in which the instrumentation agent is embedded. Agents can be implemented in a variety of ways, including instrumenting each component with a corresponding agent, instrumenting an application or other collection of the software components with a single, shared agent, among other examples.

Agents (e.g., 255, 256) can generate transaction data (e.g., 252) or other data describing the components and transactions monitored by the respective agents. Agents can communicate this information to other components of the system (e.g., components of development system 105 or testing system 110) for further use. In some cases, agents (e.g., 255, 256) can generate transaction data 252 and report the same to agent manager 210. In some cases, data reported by the agents (e.g., 255, 256) to the agent manager 210 can be further processed by the agent manager (e.g., to generate transaction data 252 from information received from multiple different agents (e.g., 255, 256) instrumented within a system), among other example implementations.

When monitoring a component or communication path between components, an agent can identify, detect, or intercept a request, response, and/or other activity involving the component(s). An agent (e.g., 254, 258) can be configured to identify and record contents of the requests and responses as well as detect one or more characteristics associated with that activity and/or the monitoring of that activity by the agent. The characteristics can include a frame identifier, which identifies a message, with respect to the agent, sent by the instrumentation agent to a managing service, such as agent manager 210 to report the characteristics observed by the agent. For instance, frames can include a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent. The agent (e.g., 255, 256) can then cause information identifying those characteristics to be provided to one or more other services or tools (e.g., 210) communicatively coupled to the agent. In some embodiments, each instrumentation agent collects information to form a message, also referred to herein as a frame, which describes characteristics associated with both a detected request and a detected response corresponding to that request. In such embodiments, the respective agent can wait for the response corresponding to the request to be generated and sent before sending the frame to another tool or system making use of the information in the frame. Additionally, agents can monitor and report characteristics independently for each transaction in which its respective monitored component(s) (e.g., 226, 228, etc.) participates. In addition to monitoring the performance of a component and aggregating information about that component over one or a multitude of transactions (such that information about the performance of individual transactions can, for example, be averaged or statistically assessed based upon the observed performance of the component over the course of multiple monitored transactions), agents (e.g., 255, 256) can additionally provide characteristics that are specific to and correlated with a specific transaction. More particularly, these characteristics that are monitored and reported by the agents can be specific to and correlated with a particular request and/or response generated as a part, or fragment, of a transaction.

In some embodiments, all or some of agents (e.g., 255, 256) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written.

In some instances, agents (e.g., 255, 256) can be configured to monitor individual threads by monitoring the storage used by each thread (i.e., the thread local storage for that thread), among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like.

As noted above, in some implementations, one of the characteristics that can be collected by agents (e.g., 255, 256) can include timing information, such as a timestamp, that indicates when a particular request was received or when a particular response was generated. Such timing information can be included in transaction data 252 and be used, for instance, by transaction path engine 215, to identify that frames, including frames received from different agents, are related to the same transaction. In some implementations, timers used by agents (e.g., 255, 256) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 255, 256) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 255, 256) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 252, among other examples.

As requests and responses progress through one or more systems (e.g., 115, 120), additional characteristic information can be captured, for instance, as transaction data 252. For example, a test, simulation, or live operation of one or more software systems (e.g., 115, 120, 226, 228) engaged in one or more transactions can be monitored, for instance, by one or more agents (e.g., 255, 256) and the agents can capture characteristic information associated with requests in the transaction (e.g., the time at which the request was received, the sender of that request, the time at which corresponding requests were sent to a database and/or other service, etc., how much data was exchanged, the identity of the communication channel used in the request or response, and the like) and the corresponding response, and generate transaction data 240 embodying the information. Agents in some instances can store at least a portion of the transaction data at the agent and can also, or alternatively, send transaction data 252 to other services and tools. In some instances, transaction data can be generated from or comprise agent data, among other examples.

In one implementation, a transaction path engine 215 can access and utilize transaction information in transaction data 252 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction. In some embodiments, in order to group frames, or otherwise identify relationships between frames or transaction fragments, transaction path engine 215 (or another tool) can sort the frames based upon particular characteristics, such as timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information. In other examples, frames can be sorted, for example, based on an amount of data exchanged, the identity of a particular communication channel or network connection used, the identification of the particular agents that provided the frames, etc.

After sorting the frames, transaction path engine 215 can then group the frames into transactions based on the identified relationships between the detected transaction fragments. In some implementations, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

Within a group of frames or identified transaction fragments associated with the same transaction, transaction path engine 215 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, among other examples.

As noted above, a transaction path engine 215 may determine relationships between transaction fragments during a monitoring session (e.g., from an initial request that triggers further downstream requests and responses leading to the ultimate response to the initial request) and utilize these relationships to stitch transaction fragment information collected from potentially multiple frames from multiple agents, to develop a chain of transaction fragments that map to the actual flow of the transaction as it traverses multiple software components of the system (and potentially multiple agent domains). Path data 254 can be generated to define the determined relationships or stitching of fragments (and related transaction data 252) in transactions monitored by the system (e.g., using agents 255, 256). This can allow concurrent transaction fragments, even transaction fragments of the same type, to be distinguished from one another on the basis of the transaction, session, or flow to which each transaction fragment respectively belongs. Attributes detected for a particular transaction fragment can thereby also be associated with other transaction fragments in the same chain or flow, even when these same attributes are not readily present in other fragments of the transaction. As an example a user session identifier, a value included in content of a particular request or response, an IP address of a particular component in the transaction, or other attributes captured during monitoring of one transaction fragment can form the basis of categorizing the entire transaction (together with its component transaction fragments) on the basis of one or more of such attributes. In some cases, criteria or filters (e.g., 258) can be defined based on such attributes and transactions in which one or more related attributes are detected (e.g., as designated by the filter (e.g., 258)) can be handled differently than other transactions not meeting such criteria (even when the transactions are otherwise of the same general type, only differing by these defined attributes and criteria), among other examples.

A development system 105 may include a filter manager 220 in some implementations. A filter manager 220 can provide a user interface through which users can define criteria to automatically filter transaction data 252 and corresponding transactions (and transaction fragments) for various development tasks. For instance, a transaction filter (e.g., 258) can be defined to flag all transactions (and related transaction data 252) initiated by a particular user or taking place in a session involving a particular user, among other examples. In another example, a filter can be defined based on values of content or the size of a payload of a particular request or response within a transaction chain. In still another example, a filter 258 can be defined based on criteria designating transactions initiated or involving one or more particular computing devices (e.g., a client system (e.g., 130)), as designated by the IP address(es) or port number(s) of the computing devices appearing in transaction data reported back by agents (e.g., 255, 256), among other examples (such as filters based on transaction category (e.g., HTTP, REST, WS, EJB, JMS, POJO), whether a source or destination address is a local or remote address, agent identifier, class/method name, etc.). A filter (e.g., 258) can further define certain actions to be taken on or designations to be made for transactions and/or related transaction data 252 meeting the filter's criteria.

In one example, one or more filters can be defined to designate that transaction data of transactions meeting a particular criteria be used as the basis for generating one or more models (e.g., a virtual service 260 or test case 265) of one or more particular components participating within the transaction. Further, the generation of such models can be allowed to proceed automatically and autonomously by the development system 105 (e.g., using model generator 205) without further input or involvement of a user, among other examples. Additionally, in some examples, a filter (e.g., 258) can designate that a model not only be automatically generated from transaction data of transactions meeting the filter's criteria, but that the resulting model be used immediately upon generation, for instance, by launching one or more transactions (e.g., using transaction manager 225), in which the model is to stand-in for the software component it is modeling, among other examples.

In the example of FIG. 2, a model generator (e.g., 205) can generate models including virtual services (e.g., simulating response behavior of corresponding system components) and test cases (e.g., simulating request behavior of corresponding system components). In some cases, a test generation engine 235 includes logic to generate test cases (e.g., 265) and a virtual service generation engine 240 is operable to generate virtual service models (e.g., 260) from which virtual services (e.g., 250) can be instantiated (e.g., in a virtual service environment (e.g., 245). In some examples, a model generator 205 can possess functionality to generate both test cases and service models (and even combinations of both for some software components), while in other instances a test generation engine 235 and a virtual service generation engine 240 are implemented separately. Each of a test generation engine 235 and a virtual service generation engine 240 can generate their respective models (e.g., 265, 260) autonomously in some instances (e.g., without user inputs or intervention and in connection with a transaction filter 258), while in other cases the a test generation engine 235 and a virtual service generation engine 240 may provide user interfaces through which users can provide manual inputs and direction, among other features. Further, a model generator 205 (or other component of development system 105) can possess functionality for autonomously generating, provisioning, and launching a model within an environment to stand-in for a corresponding software components within a particular transaction (e.g., a transaction within a test or development sandbox, etc.), among other example features.

Indeed, in some implementations, test case generation engine 235 can utilize intelligence gleaned from transaction path engine 215 to develop, improve, and generate test actions, including test cases, to be run against one or more of the software components or systems involved in a transaction. A test case (e.g., 265) can generate synthesized requests of a client system or even a software component in the middle of a transaction chain, based on requests observed during monitoring of the software component within a transaction. The test case 265 can be launched to simulate operation (e.g., requests) of the corresponding software components. In some instances, a test case can further include logic to identify whether a response to the request arrives as expected (e.g., with characteristics and/or content similar to or matching that of the response(s) observed during monitoring of transactions involving the software component). A test case (e.g., 265) can be used to issue requests to launch instances of particular types of transactions or transactions with certain expected characteristics (e.g., based on observed previous instances of the same or similar transactions). A test case (e.g., 265), in some cases, can be accessed and used by a testing system 110 in tests of a system (including systems other than the system in which related transactions were monitored and observed (e.g., forming the basis of the test case)).

Transaction data 252 can be further used by a virtual service generator 240 to generate service models 260 modeling response behavior of particular software components. A service model 260 can be used, for instance by a virtual service engine 230, to instantiate a virtual service 250 in a virtual service environment 245 based on the service model 260. A virtual service can be provisioned (e.g., using virtual service instantiator 242) within the virtual service environment 245 and requests intended for a corresponding software component can be redirected to the virtual service and the virtual service 250 can generate and return simulated responses of the modeled software in response to the redirected request. Virtual services 250 can thus be used as stand-ins in transactions involving the real-world software components modeled by the virtual service. Virtual services 250 can capture and simulate the behavior, data and performance characteristics of complete composite application environments, making them available for development and testing at the request of a user or system (e.g., based on satisfaction of a filter 258), among other advantages.

Virtual services may provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual service environment 245 implemented, for instance, within on-premise computing environments, in private and public cloud-based lab, using virtual machines, traditional operating systems, and other environments, among other examples. In some implementations, virtual service engine 230 and virtual services 250 can utilize or adopt principled described, for example, in U.S. Pat. No. 8,112,262 entitled "Service Modeling and Virtualization," incorporated herein by reference in its entirety as if completely and fully set forth herein.

Figure 3:
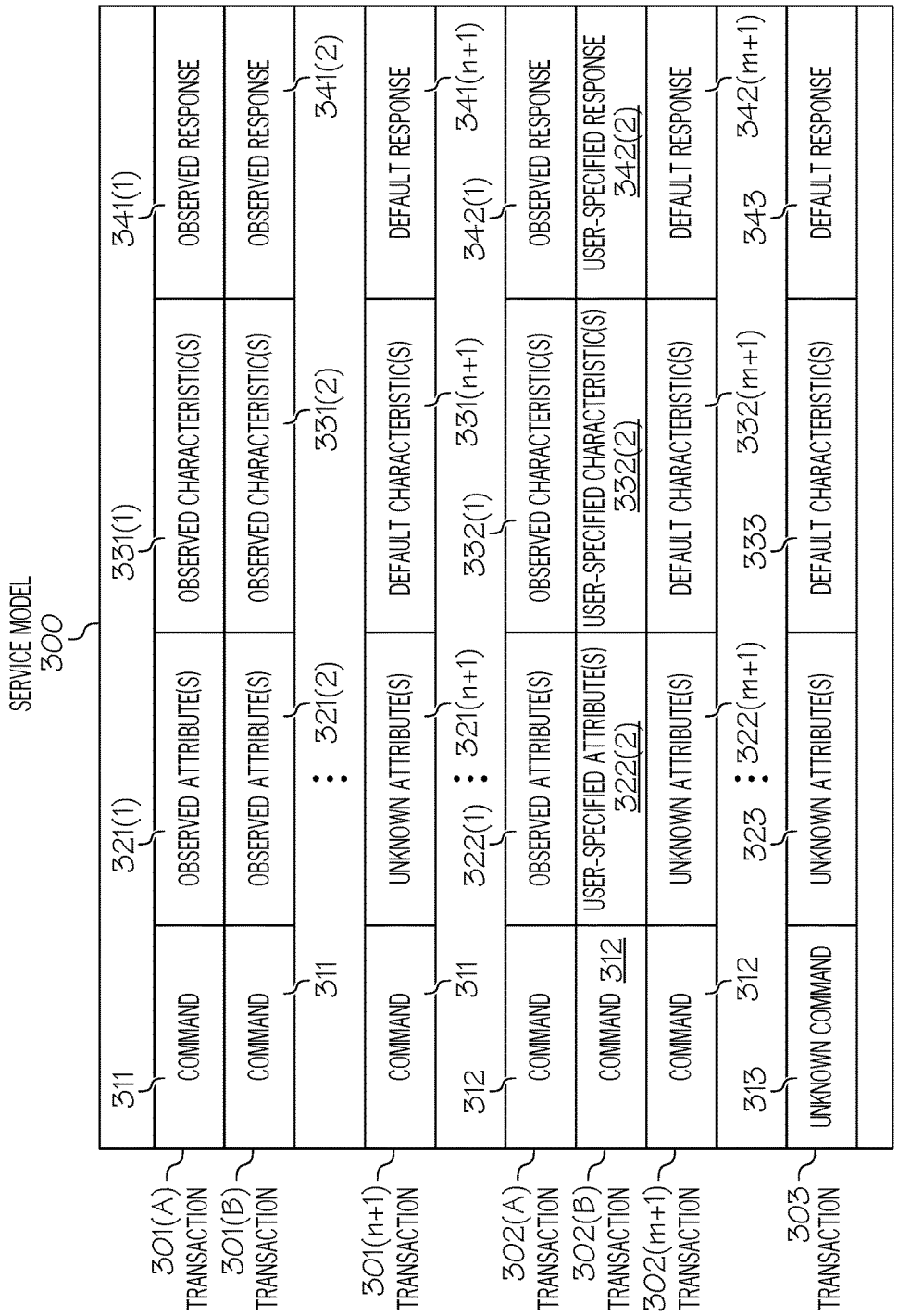
FIG. 3 is a simplified block diagram illustrating an example service model in accordance with at least one embodiment.

Turning to FIG. 3, a simplified block diagram is shown representing an example view of an example virtual service model 300 that can be generated by a virtual service generation engine 240 from transaction data 252. For instance, FIG. 3 shows information that can be maintained as part of a service model. In this particular example, service model 300 can include a row for each of several transactions. Each row of service model 300 can identify a command, zero or more attributes, zero or more characteristics, and one or more response attributes. This service model can be stored in a spreadsheet, table, database, or any other data structure and may include additional information, such as the information described in one or more of the examples above.

In this example, transaction 301(A) is a transaction corresponding to a scenario defined in an interaction contract defined between two or more developers. In other instances, transaction 301(A) can be a transaction that was an observed transaction that actually occurred between a requester and a server component being modeled, as detected, for instance, by an agent or other tool. The information describing transaction 301(A) can include request information, which includes command 311 and zero or more defined attributes 321(1). The information describing transaction 301(A) can also include response information 341(1) describing the expected response that corresponds to the request. This response information 341(1) can also include one or more attributes. Characteristics 331(1) can include zero of more characteristics of transaction 301(A) defined based on scenarios of the interaction contract. These characteristics can include timing information describing a threshold delay of a response to a request or the like, as described above.

Transaction 301(B) can be of the same transaction type as transaction 301(A), since both transactions included a request that contained command 311. Transaction 301(B) is described by attributes 321(2) (which can have values that differ from those attributes defined in the request of transaction 301(A)), characteristics 331(2) (which can again differ from those for transaction 301(A)), and response 341(2) (which can also have a value that differs from the response defined for transaction 301(A)).

In this example, information describing n (an integer number) known transactions of the same type as transactions 301(A) and 301(B) is stored in service model 300. These known transactions are transactions that were either generated from scenario data or manually specified by a user. As part of the model building process, information describing an n+1th transaction of the same type has been added to service model 300 by the service model generator. This n+1th transaction, labeled transaction 301(n+1), can describe an "unknown" transaction of a known type of transaction. Such an unknown transactions is of a known type because it has the same command, command 311, as the other transactions of this type. However, unlike the other known transactions of this type, unknown transaction 301(n+1) can be used to respond to requests containing command 311 and "unknown" attributes that do not match those known attributes stored for transactions 301(A)-201(n) (not shown). The information describing transaction 301(n+1) thus includes information (e.g., wildcard information) identifying unknown attributes 321(n+1), such that any request that includes command 311 and an attribute that does not match the defined attributes stored for the actual transactions (e.g., such as transactions 301(A) and 301(B)) will match the request information for transaction 301(n+1). The information describing transaction 321(n+1) can also include default characteristics 331(n+1) and default response 341(n+1). These default values can be copied from the corresponding fields of an actual response of the same type.

Information describing another set of transactions of a different type can also be stored within the service model 300 for a particular software component. As shown, m+1 transactions, including transaction 302(A), 302(B), and 302(m+1) of a type of transaction in which the request includes command 312 can be stored in service model 300. Like transactions 301(A) and 301(B), transaction 302(A) can be another transaction corresponding to a scenario and involving the particular software component. Further, the information describing this transaction can also include the corresponding command 312, attributes 322(1) (if any), defined characteristics 332(1) (if any), and corresponding response 342(1).

In some instances, a model generate can automatically generate models operable to generate requests and/or responses of real version of a software component. The simulated, or synthesized, requests and responses can also exhibit or mimic content and performance characteristics of requests and responses generated by the real version of the software component modeled by the model. Such models can be derive this synthesized behavior on the basis of attributes and characteristics of the requests and responses described in transaction data generated from previously-detected and monitored transactions. In some implementations, a user can supplement the transaction defined by the model generator with one or more user-specified transactions, for instance, in the event of a change or exception to the interaction contract or to capture a nuance not adequately detected and captured by the model generator, among other examples. For instance, a user can enter the information describing such a transaction via a user interface. The information describing transaction 302(B) can include command 312, zero or more user-specified attributes 322(2), zero or more user-specified characteristics 332(2), and a user-specified response 342(2). In some embodiments, the user is prompted for entirely new information for each of these user-specified fields. In other embodiments, the user can be allowed to select an existing field (e.g., of another user-specified transaction or of an automatically-detected transaction) to copy into one or more of these fields. It is noted that a user can also create a user-specified transaction by modifying information describing an actual transaction. As FIG. 3 shows, user-supplied transaction information can be stored in the same model as transaction information generated from parsing of scenario data of an interaction contract. In other instances, service models can be generated that are dedicated to user-supplied transaction information while others are dedicated to transaction information generated from scenario data by a model generator, among other examples.

In some instances, a service model 300 can also include information describing an unknown transaction 302(m+1). The information describing transaction 302(m+1) was added to service model 300 after m (an integer number, which does not necessarily have the same value as n) known transactions were described by the model. The information describing this unknown transaction 302(m+1) can be used to handle requests of the same type (e.g., containing command 312) that specify unknown attributes. Accordingly, the information describing transaction 302(m+1) can include command 312, unknown attributes 322(m+1) (i.e., attribute information that will match any attributes not identified in the known attributes stored for the other m transactions of this type), default characteristics 332(m+1), and default response 342(m+1). Further, transactions of an unknown transaction of unknown type (e.g., 303) can also be defined in a service model 300. For instance, the information describing transaction 303 can be used to respond to any request of a type not already described by another row of service model 300. Accordingly, a request containing a command other than commands 311 and 312 could be responded to using the information describing transaction 303, among other examples. As shown, the information describing transaction 303 includes unknown command information 313, which is configured to match any command not already specified in service model 300, unknown attribute information 323, which is configured to match all attributes (if any) associated with unknown commands, default characteristics 333, and a default response 343. As with the default characteristics and responses associated with unknown transactions of known type, transaction 303's default characteristics and response can be user-specified.

Figure 4:
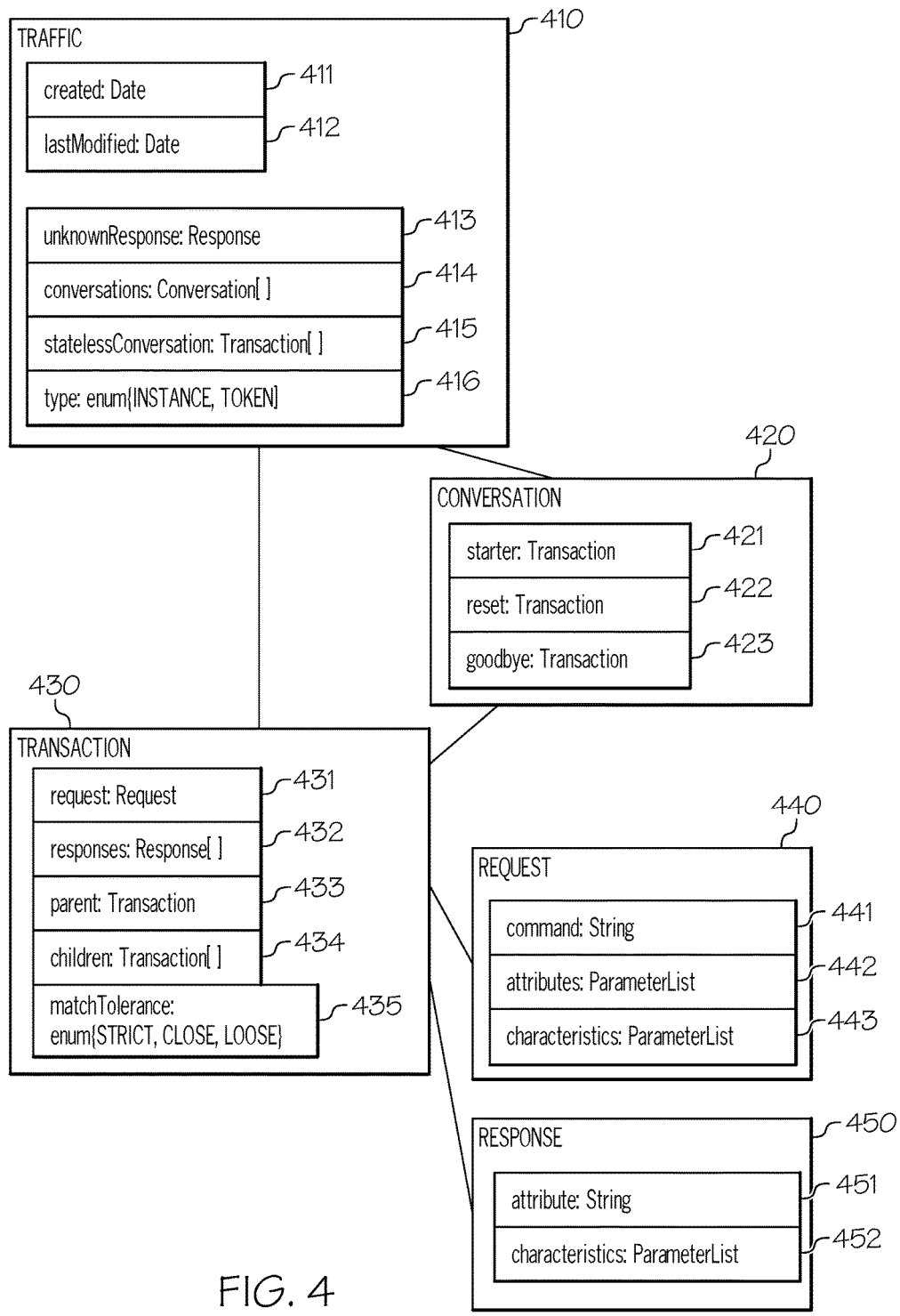
FIG. 4 is a simplified block diagram illustrating aspect of another example service model in accordance with at least one embodiment.

Turning to FIG. 4, a simplified block diagram is shown illustrating representing example features of an example service model for use in virtual services supporting stateful and stateless transactions. Statefulness of a transaction can be identified from parsing of scenario data to generate a service model supporting the modeling of such stateful transactions. In the example of FIG. 4, a data model is shown that includes five data patterns: traffic pattern 410, conversation pattern 420, transaction pattern 430, request pattern 440, and response pattern 450. Traffic pattern 410 can be used to store information identifying a particular software application to be developed in accordance with an interaction contract and the transactions of such an application. Each service model can include a single instance of traffic pattern 410. As shown, traffic pattern 410 includes created field 411, which stores date information identifying when the service model of that particular application was initially created. Traffic pattern 410 also includes lastModified field 412, which stores date information identifying the most recent time at which any of the information in the service model of the particular service was modified.

Traffic pattern 410 can also include an unknownResponse field 413. UnknownResponse field 413 can store information identifying the particular instance of the response pattern that stores information identifying the response to use for unknown transactions of unknown types. Accordingly, in embodiments employing the data pattern of FIG. 4, if an unknown transaction of unknown type is detected by a request processing module, the request processing module will use the response pattern instance identified in unknownResponse field 413 to generate a response.

Traffic pattern 410 includes conversations field 414. Conversations field 414 can identify one or more instances of conversation pattern 420. Conversation pattern 420 stores information representing a set of two or more stateful transactions. Such a set of stateful transactions is referred to herein as a conversation. The instance(s) of conversation pattern 420 identified in conversations field 414 identify all of the conversations for the application to be modeled. If the particular service does not include any stateful transactions (e.g., if no stateful transactions are identified from scenarios defined for an interaction contract), conversations field 414 will not identify any instances of conversation pattern 420.

Traffic pattern 410 can additionally include statelessConversation field 415. This field can identify one or more instances of transaction pattern 430. Transaction pattern 430 stores information representing a transaction. Each instance of transaction pattern 430 identified in statelessConversation field 415 stores information identifying a stateless transaction. StatelessConversation field 415 can identify instances of transaction pattern 430 associated with both known and unknown transactions of known types. If the particular service being modeled does not include any stateless transactions, statelessConversation field 415 will not identify any instances of transaction pattern 430. Type field 416 can store one of two values: INSTANCE or TOKEN that identifies the type of stateful transactions, if any, provided by the service being modeled.

As noted above, conversation pattern 420 can store information identifying a set of stateful transactions. A given service model can include n instances of conversation pattern 420, where n is an integer that is greater than or equal to zero. Conversation pattern 420 can include a starter field 421. This field stores information identifying an instance of transaction pattern 430 associated with a starter transaction. The starter transaction is a transaction that acts as the first transaction in a stateful series of transactions (e.g., a login transaction). In at least some embodiments, all starter transactions can be unknown transactions of known type, as will be described in more detail below. The particular transaction type to use as a starter transaction can be specified by the model generator or a user during the service model configuration process.

Conversation pattern 420 also includes reset field 422. Reset field 422 stores information identifying one or more instances of transaction pattern 430, each of which is associated with a reset transaction (such a reset transaction can be a known or unknown transaction). The value of reset field 422 can be provided by a user (e.g., the user can be prompted to identify the reset transaction(s) for each conversation). A reset transaction is a transaction that, if detected, causes the flow of the conversation to return to the point just after performance of the starter transaction. Conversation pattern 420 also includes a goodbye field 423. This field stores information identifying an instance of transaction pattern 430 associated with one or more goodbye transactions (of known or unknown type) for the conversation. A goodbye transaction is a transaction that causes the conversation to end. To reenter the conversation after a goodbye transaction is performed, the starter transaction for that conversation would need to be re-performed.

Transaction pattern 430 stores information identifying a transaction. Transaction pattern 430 includes request field 431, responses field 432, parent field 433, children field 434, and matchTolerance field 435. Transaction pattern 430 can be used to store stateful and stateless transactions (in some instances, the same transaction can occur both within a conversation and in a stateless situation where no conversation is currently ongoing). Transactions that are always stateless will not include values of parent field 433, children field 434, or matchTolerance field 435.

Request field 431 identifies the instance of request pattern 440 that stores information identifying the request (e.g., by command and attributes) portion of the transaction. Similarly, responses field 432 identifies one or more instances of response pattern 450 that store information identifying the response(s) that are part of that transaction. Each instance of response pattern 450 stores one response attribute (e.g., like those shown in FIG. 2), and thus if responses field 432 identifies multiple response patterns, it indicates that each of the identified response patterns should be used to generate a response when the corresponding request is received.

Parent field 433 stores a value identifying the instance of transaction pattern 430 associated with the transaction that occurs immediately before the current transaction in a conversation. Thus, if transaction pattern 430 stores information identifying the second transaction in a conversation (where the starter transaction is the first transaction in the conversation), parent field 433 can identify the instance of transaction pattern 430 associated with the starter transaction. Similarly, children field 434 can store information identifying each instance of transaction pattern 430 associated with a child transaction of the current transaction. Thus, if transaction pattern 430 stores information identifying the second transaction in a conversation, children field 434 can store information identifying the instance of transaction pattern 430 that stores the third transaction in the conversation. It is noted that children field 434 can identify more than one transaction.

MatchTolerance field 435 can store one of three values: STRICT, CLOSE, or LOOSE. The stored value indicates the match tolerance for a request received immediately subsequent to the current transaction. Strict tolerance indicates, for instance, that, if a conversation is ongoing, the request received immediately after the current transaction is only allowed to match transactions identified in the current transaction's children field 434. If instead close tolerance is specified, the request received immediately after the current transaction can match any of the current transaction's children, as well as any of the current transaction's sibling transactions. Further, if loose tolerance is specified, even more transactions are candidates for matching the next received request, and so on.

Request pattern 440 can include a command field 441, attributes field 442, and characteristics field 443. Each instance of request pattern 440 stores information identifying a particular request. A service model generator can allocate an instance of request pattern 440 for each transaction of known or unknown type. Command field 441 can store a string that identifies the command contained in the request. Attributes field 442 can store a parameter list that includes zero or more parameters, each of which represents an attribute of the request. Characteristics field 443 can store a parameter list identifying zero or more characteristics associated with the request. Each parameter in the list can identify a different characteristic. Examples of characteristics can include the time at which the request was sent, the system clock time at which the request was received by the service being modeled, network and/or system conditions that were present when the request was received, and the like. The parameters stored in characteristics field 443 can be used to generate time sensitive values, as well as to model actual conditions such as response timing and availability window, among other examples.

Response pattern 450 can include an attribute field 451 and a characteristics field 452. Attribute field 451 stores a string that represents a response attribute. As noted above, a given transaction can have multiple response attributes (e.g., responses field 432 of transaction pattern 430 can identify multiple instances of response pattern 450), and thus generating a response can involve accessing multiple response patterns in order to include the string identified in each of the response patterns' attribute field 451 in the response. Attribute field 451 can store one or more response attributes, as well as values, like request sensitive values and time sensitive values, generated by the service model generator. Characteristics field 452 can store a parameter list containing zero or more parameters. Each parameter can identify a characteristic of the response, such as the system clock time when the response was sent to the requester by the service, network and/or system conditions that were present when the response is to be sent, and the like.

Returning to the example of FIG. 2, a testing system 110 can be provided including one or more data processing apparatus (e.g., 272) and one or more memory elements (e.g., 274), and test manager 270. In one example, a test manager 270 can be utilized to orchestrate a test of at least a portion of a system. Orchestration of a test can include the construction of a test environment that includes one or more models, such as a test case 265 and one or more virtual services (e.g., 250). A test manager 270 can further launch the test (e.g., using a test case 265) and monitor performance of one or more software components of the system in subsequent transactions and transaction fragments. In some cases, testing system 110 can be integrated with development system 105. Other components of a development system 105 may launch models (e.g., 250, 265), such as filter manager 220 and transaction manager 225, including in transactions falling outside a defined test of the system. For instance, transactions can be launched that utilize software component models (e.g., 250, 265) for purposes of further monitoring (e.g., using agents 255, 256), generation of transaction data 252, and generating further models (e.g., 250, 265), among other examples.

As noted above, a system can include various software components, which can be hosted by one or more server systems (e.g., 115, 120). A server system can include one or more data processing apparatus (e.g., 276, 278) and one or more memory elements (e.g., 280, 282) to implement the software components. A software component can refer to a complete executable, such as an application, program, or service, or may refer to sub-components of such executables, scripts, objects, or other pieces of software, which may issue requests or generate responses either within or across application boundaries, etc.

Turning now to FIGS. 5A-5F, simplified block diagrams 500a-f are shown illustrating example software systems and components capable of engaging in one or more transactions. It should be appreciated that the example systems and transactions are non-limiting, simplified examples and that a potentially limitless array of real-world systems and transactions can be monitored, analyzed, and tested in accordance with the principled outlined herein. In the particular example of FIG. 5A, a front end application (e.g., 226), such as the front end of a web application, can interface with a client component 505, such as a browser or other program capable of interfacing with application 226. The client component 505 can send requests to the front end application 226 and the front end application 226 can generate responses to client components' requests. In some cases, the front end application 226 can access a database (e.g., 510) or a backend application (e.g., 228) in connection with some transactions and the generation of some responses to client components' requests. In this example, a backend application 228 may also, in some transactions, interface with (e.g., send requests and receive responses from) other downstream components to generate responses to the front end application 226. For instance, a backend application component 228 can participate in transaction fragments with third party services (e.g., 515, 525), other data stores (e.g., 520), and other applications, services, and resources, among a variety of other examples.

Some components of a system (e.g., 226, 228) may be instrumented with agents (e.g., 255, 256), to monitor requests and responses entering or exiting the component as well as observe internal operations (and transaction fragments) within the software components during operation (and participation in the transaction). Some software components, such as third party services 515, 525, may be unmanaged in that they are not instrumented with agents under the control of or otherwise accessible to a transaction path engine, test engine, filter manager, or other tool or entity monitoring the transaction. The involvement and functionality of such unmanaged software components may remain unknown to the tools utilized in the development of transaction paths and tests of a particular transaction, and can be effectively regarded as a black box within the transaction. Characteristics and behavior of such unmanaged software components (e.g., 515, 525) may be observed indirectly, however, for instance by agents (e.g., 255, 256) monitoring components that receive requests and/or responses from the unmanaged software component. Data transmitted by the unmanaged components can be likewise intercepted and described in transaction data generated based on the agents' monitoring.

In some implementations, a single transaction can include the generation, communication, and use of multiple different response values. The generation and processing of various data within a transaction can involve the transmission of request values and response values to multiple different software components along multiple different sub-paths, or branches, of the transaction flow path. Agents (e.g., 255, 256) monitoring the transaction can provide information describing requests, responses, and operations of components within the monitored transaction. Such information (e.g., embodied in transaction data) can be used to determine a flow path for the transactions.

Figure 5A:
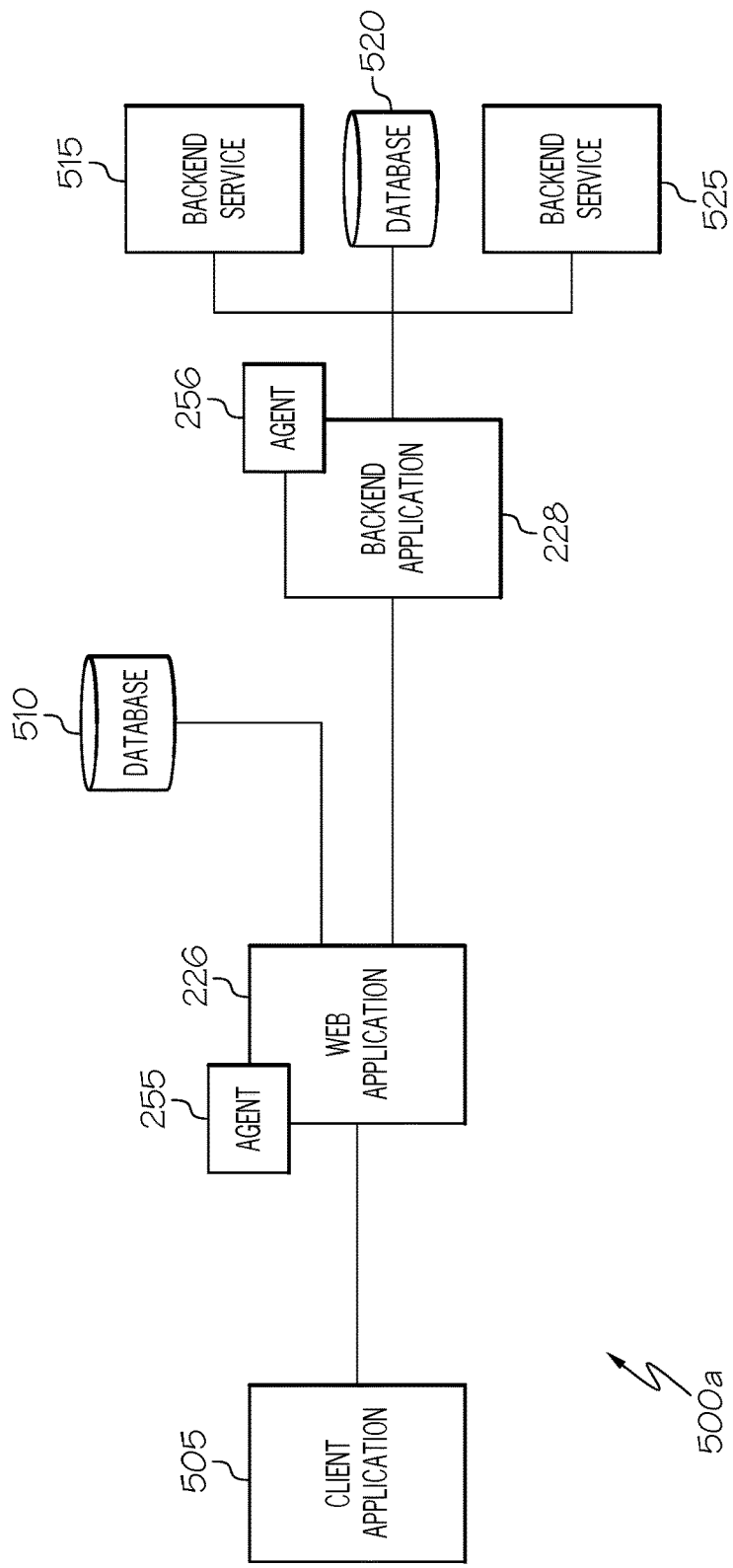
FIGS. 5A-5F are simplified block diagrams illustrating example implementations of a software system in accordance with at least one embodiment.
Figure 5B:
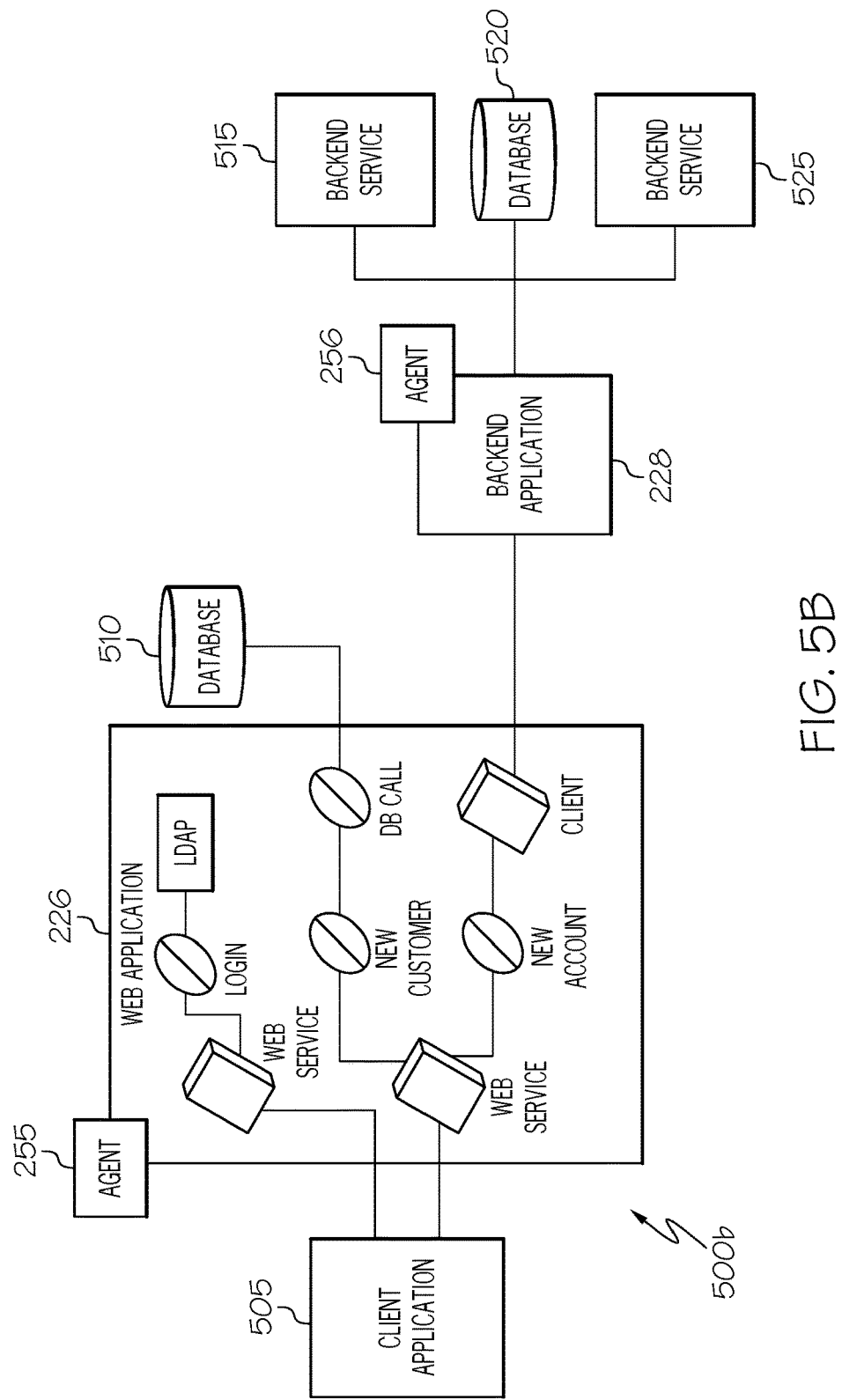

Turning to FIG. 5B, individual applications and services can include components, which may interact in additional transaction fragments. For instance, a front end application 226 may include various components such as a Login software component (e.g., implemented in this particular example as JavaBean software components) accessible through a web service call (such as a SOAP call) and Lightweight Directory Access Protocol (LDAP) system to facilitate the logging-in of a user into an account of a web application. The application 226 of this example may include additional components to facilitate additional transactions, such as a New Account component for use in generating a new account and storing new account information in a database 510 (e.g., through a database call component), among a potentially limitless variety of other examples. Backend application 228 may likewise include multiple internal components capable of participating in transaction fragments internal to the backend application 228, as well as supporting transaction fragments with other applications and services (e.g., 226, 515, 520, 525, etc.).

Figure 5C:
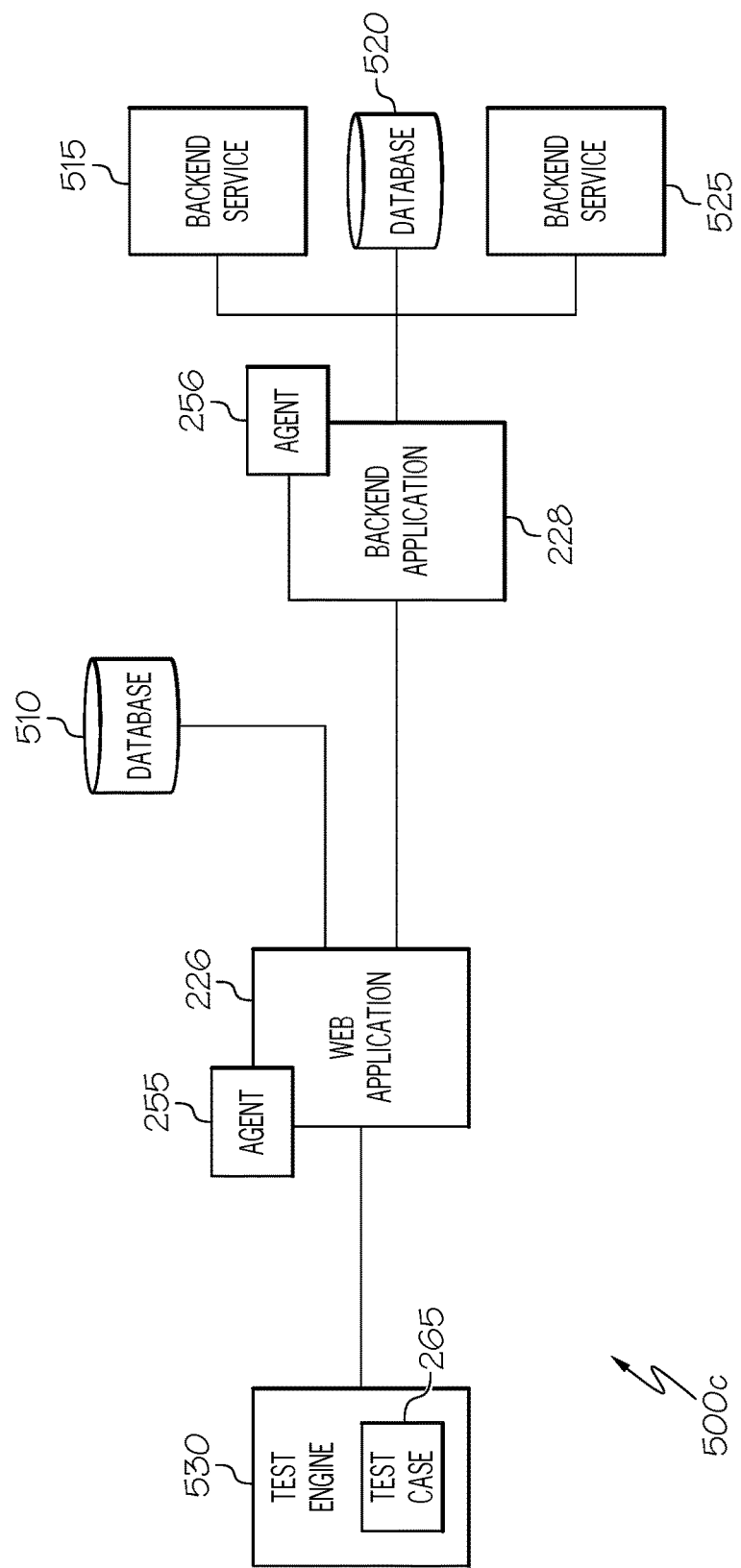

Models can be generated from transaction data describing transactions and transaction fragments monitored by a system (e.g., using agents 255, 256). For example, as shown in the example of FIG. 5C, a test case 265 can be launched (e.g., in a test engine 530) to stand-in for a client component (e.g., 505) in a transaction. The test case 265 can be launched, in some examples, in connection with a test to verify the correct operation of one or more software components under test. A synthesized request can be generated from the test case 265 to launch a chain of transaction fragments (from the initial request) between at least a portion of components (e.g., 226, 228, 510, 515, 520, 525, etc.) downstream from the test case 265. The synthesized request can simulate a request that would be sent from the client component 505 (e.g., based on monitoring of previous transactions involving the client component). Transactions launched from synthesized requests generated by the test case 265 can likewise be monitored by agents (e.g., 255, 256) instrumented on components participating in the launched transactions.

Figure 5D:
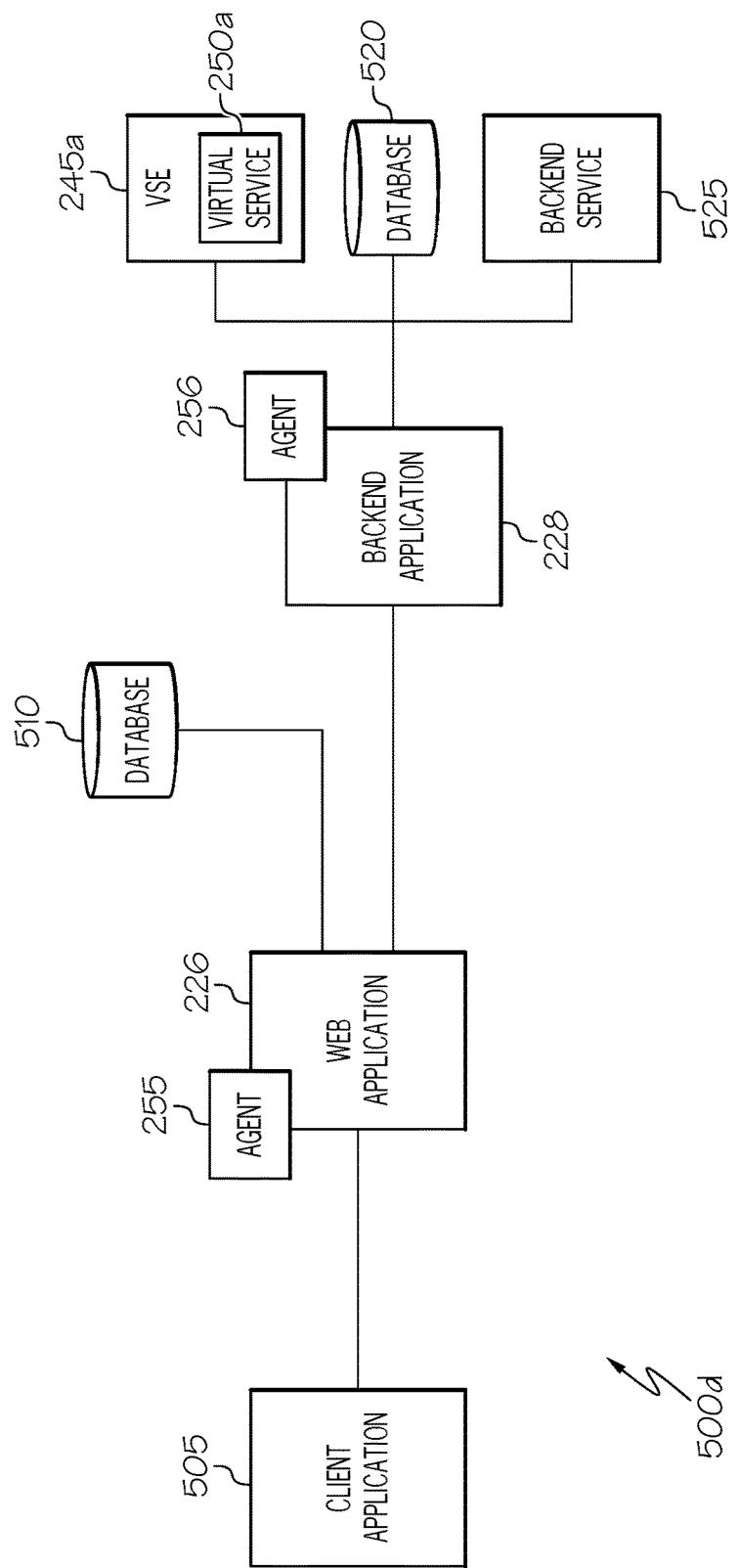

Turning to FIG. 5D, a virtual service (e.g., 250a) can be launched from a corresponding service model modeling response patterns of a particular software component (e.g., a backend service 515) to requests observed (e.g., by agent 256) during monitoring of transactions of the system. The virtual service 250a can be hosted in a virtual service environment (e.g., 245a) and requests by backend application 228 ordinarily intended for backend service 515 can be redirected to the virtual service environment 245a for processing by the virtual service 250*a* simulating operation of the backend service 515. Transactions can be initiated and run utilizing live versions of several components (e.g., 226, 228, 505, 510, 520, 525), but with virtual service 250*a* being used instead of backend service 515 in at least some of the transactions. Agents (e.g., 255, 256) can likewise monitor these transactions and generate transaction data to describe the component transaction fragments and the operating characteristics of one or more of the participating software components (e.g., 226, 228, 505, 510, 520, 525).

Figure 5E:
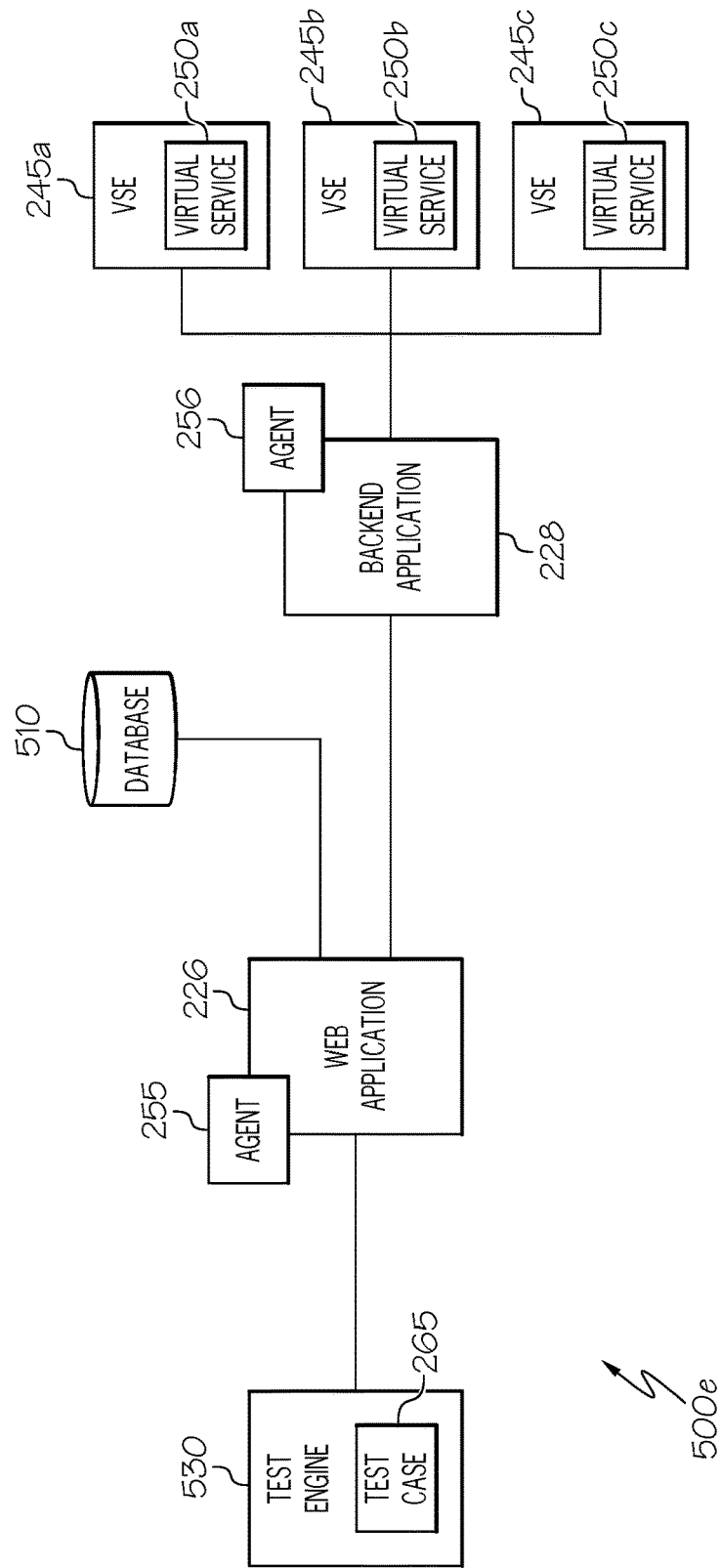
Figure 5F:
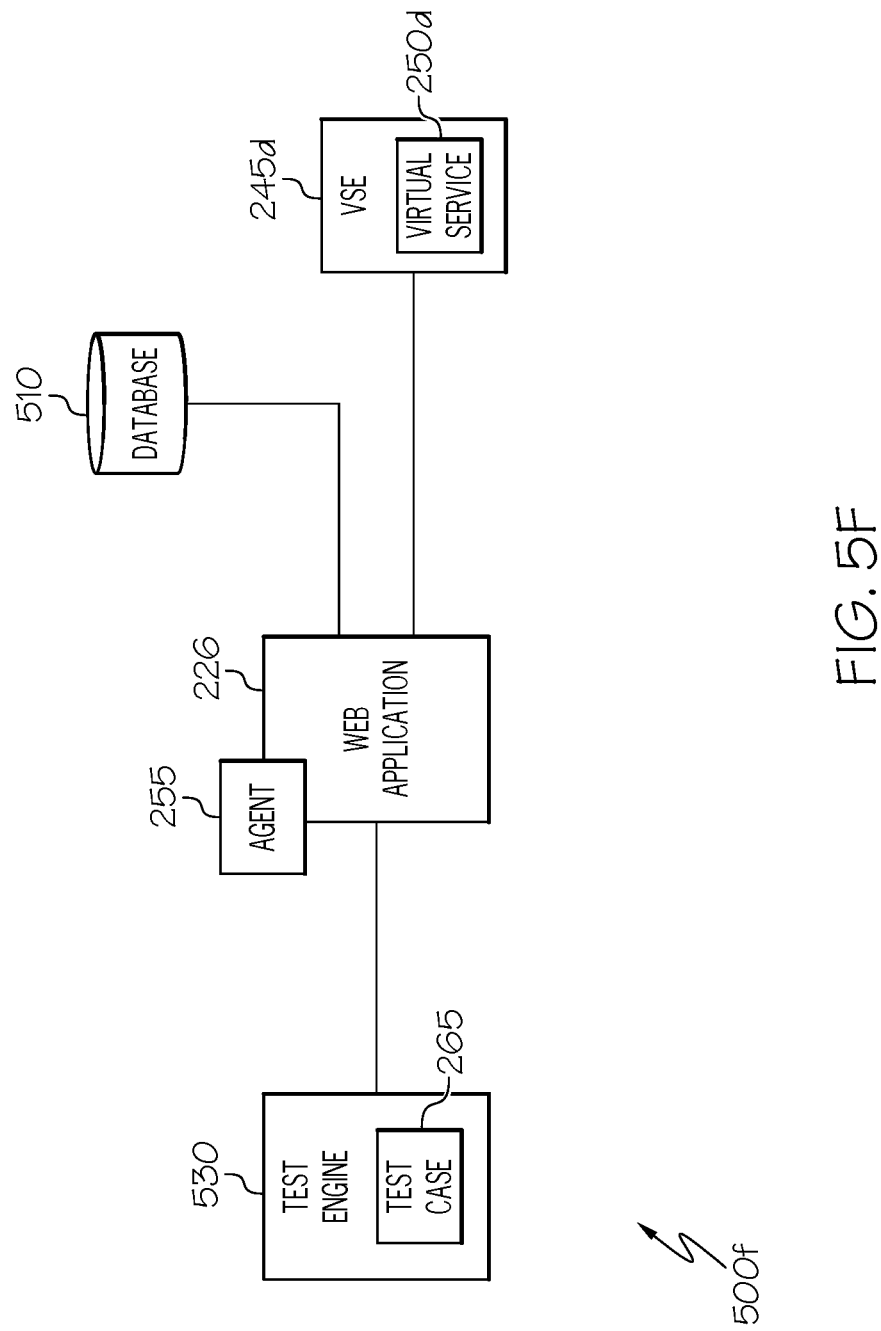

Virtual services (or test cases) can be launched within a system to model more than one of the software components (e.g., 226, 228, 505, 510, 515, 520, 525) in a system. For instance, as shown in the example of FIG. 5E, a respective virtual service (e.g., 250*a-c*) can be generated and launched (e.g., in respective service environments 245*a-c*) to stand-in for components 515, 520, 525 in at least some transactions (in other contemporaneous transactions, the real versions of the modeled components 515, 520, 525 can be used (e.g., based on predefined conditions for using or not using a model (e.g., 245*a-c*) when it is available)). In yet another example, multiple downstream components can be effectively replaced by substituting a real version of one or more software component (e.g., 228) with a corresponding model, such as virtual service 250*d* (launched in virtual service environment 245*d*), such as shown FIG. 5F. In the example of FIG. 5F, because responses generated by backend application 228 may be based on responses it receives from other components (e.g., 515, 520, 525) further downstream the synthesized responses of the backend application 228 generated by a corresponding virtual service 250*d* (based on observed transactions involving the backend application 228 and components 515, 520, 525) the virtual service 250*d* may also effectively stand-in for the other downstream components 515, 520, 525, among other examples involving expansive varieties of different software systems, each with their own composition of software components and supported transactions.

In some implementations, monitoring transactions of a system can be carried out on a continuous basis, with each observed request and/or response within the system potentially resulting in corresponding transaction data being generated. As multiple transactions may be initiated and completed substantially concurrently within a system, large amounts of transaction data may be generated. It can be difficult for human users to sort, or even design filters post hoc to determine which of the transaction data pertains to transactions that are of particular interest to a user or which transaction data is most appropriate to use to generate a desired set, or library, of software component models (e.g., test cases and virtual services) for use in other development activities.

Figure 6:
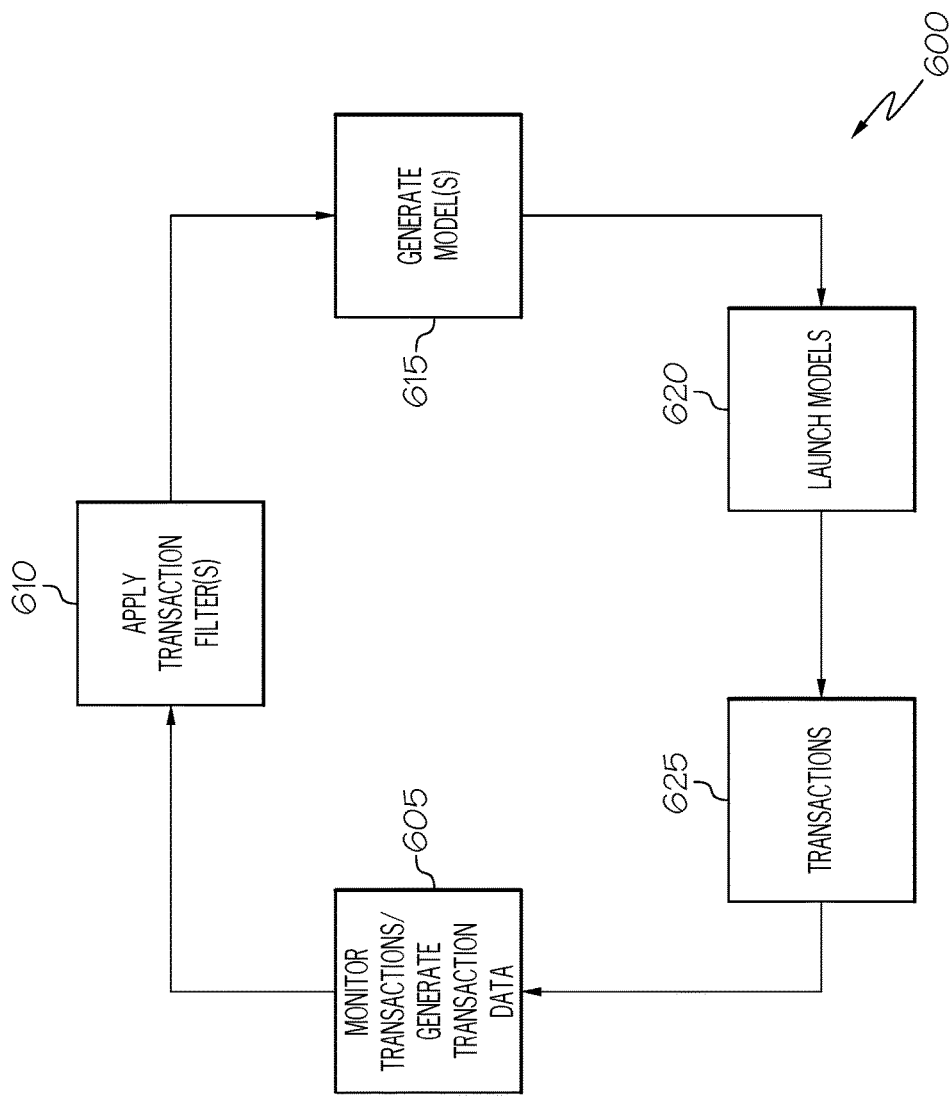
FIG. 6 is a flow diagram illustrating continuous monitoring of and automated development of models for a system in accordance with at least one embodiment.

Turning to FIG. 6, transaction filters can be defined to identify, as transactions are taking place within the system, which of these transactions correspond to a sample from which a model should be generated. Transactions can be monitored and corresponding transaction data can be generated (at 605) to describe these transactions. As transaction data is generated (or reported by agents) attributes of transaction fragments or participating software components described in the transaction data can be parsed according to a set of one or many different transaction filters (e.g., at 610), to determine whether a transaction fragment of a corresponding transaction evidences one or more attributes triggering a condition or criteria of a defined filter. At least some of the filters can define the conditional triggering of the generation of a software component model from transaction data describing the attribute(s). Through stitching, related transaction data describing other fragments of the same transaction can also be identified by the system and utilized (by a model generator) to generate (at 615) the desired model. Indeed, identifying the transaction data for use in generating the model and generating the model itself can be automated by the system and utilize no additional input or participation by a human user. Accordingly, applying transaction filters to transaction data (e.g., in real time as it is created from monitoring of contemporaneous transactions) can assist in automating the generation of a robust library of models, which may be used in a variety of tests and other development activities for a software system.

In some implementations, as illustrated in FIG. 6, transaction filtering 610 can not only be used to automate the selection of transaction data for use in generating corresponding models (e.g., in response to identifying the satisfaction of a corresponding filter's criteria), but can also define that models automatically generated from the satisfaction of a filter also be automatically launched (at 620) within an environment in which transactions are proceeding or are to proceed. The launching of models 620 can also be automated in that they take place without user input. For instance, a user may initiate an initial transaction, which can be monitored 605 and assessed according to one or more defined filters 610. The resulting of the filtering 610 can be the generation 615 and launching 620 of one or more models modeling one or more of the software components that participated in the transaction (as defined in the filter). The generation 615 and launching 620 of the models effectively takes place in the background, all the result of potentially a single transaction initiated within the system by a user or other system, based on the defined filters.

Upon launching 620 models within a system, operation and transactions 625 of the system can continue with the models standing-in for the components they simulate in at least a portion of the transactions. In the case of test cases, the launching 620 of the test cases themselves can result in the generation of synthesized requests, which launch at least some of these subsequent transactions 625. These transactions 625 can likewise be monitored 605, with corresponding transaction data being generated to describe the transactions as observed by one or more agents provisioned within the system. These transactions (and transaction data) can likewise be assessed according to the filters 610 and, in some cases, trigger the automated generation and launching of additional models based on these subsequent transactions.

In some cases, subsequent transactions 625 that involve the generated models will look similar or even identical to the previously observed transactions whereon the models were based. These transactions can trigger the same filters based on the same attributes and criteria as the previously observed transactions, resulting in potentially an infinite feedback loop where duplicate models are generated in a loop. To prevent this, additional filters (or other checks) can be defined for use by the system to prevent identical copies of a model from being generated 615 (and launched 620) from subsequent identical instances of transactions, transaction fragments, and related transaction data. For instance, a filter can be defined that checks to see whether an identical or substantially similar subset of the transaction data has already been used to generate an existing model to prevent a substantially identical copy of the same model from being generated from the new similar transaction data. In other words, filters can be defined to detect changes between previous and current instances of a transaction observed by the system (e.g., using corresponding agents). Should differences (or sufficient differences) be detected, a filter can allow a corresponding model to be generated 615 to simulate the different behavior (e.g., of potentially the same software component within the same type of transaction). Accordingly, the cycle 600 illustrated in FIG. 6 shows that a system (e.g., a development system) can operate autonomously based on defined filters to continuously generate and launch models simulating various software components and transactions, as well as to autonomously detect opportunities to generate new models modeling newly observed behaviors not yet detected (or modeled) within the system. Detecting differences observed in the same types of transactions between the same software components can also be used as the basis for determining and identifying changes to a system or differences between systems, among other example uses.

In one example, filtering (e.g., 610) can involve user involvement to create, define, and fine tune (e.g., edit) the transaction filters to be used by the system. This can include defining and establishing weights for various criteria. Criteria can allow filters to filter "unwanted" transactions (e.g., from the perspective of generating models for a system). Filters can filter transactions on one or more basis including transaction type (e.g., request type(s)), categories, time of the transaction, address (e.g., URL, IP address, etc.) of a component involved in the transaction, a class or method used in the transaction, values within payload content of a request or response, a user or group identifier (e.g., to filter for transactions from a particular developer user, a particular corporation, or other entity), a session identifier, the inclusion of tag (e.g., inserted by the client or among other examples. Applying filters to transaction data can, in some examples, result in tagging of the transaction data determined (e.g., through stitching) as related to the same transaction, allowing this transaction data to be identified and accessed by downstream processes (e.g., model generators). Indeed, tags may identify a type of model to generate and for which component(s) from the tagged transaction data (and according to the corresponding filter), among other information. In some cases, a piece of transaction data may be tagged multiple times according to multiple filters such that the piece of transaction data can be identified and used in the generation of potentially multiple different models, among other examples.

Launching models generated according to the applied filters can include launching either (or both) virtual services and test cases. In the case of virtual services, virtual services may be pre-launched before a transaction (that is to use the virtual service) is initiated. Test cases can be launched to trigger new transaction instances. In some cases, test cases may be designed to generate a synthesized version of the same request that initiated the transaction upon which the test case is generated—thereby triggering another instance of the same transaction. In some cases, a transaction manager or scheduler can be utilized to orchestrate the launching 620 of models. For instance, a model can be launched in connection with a test (e.g., managed or monitored in at least in part by a testing system) or other task. Performance of the transactions and system can be monitored in a test for performance characteristics, system configurations, errors, and other aspects. Indeed, a filter can be defined to specify the nature of the automated launching of a model. For instance, the filter can cause the model to be launched in the same system or in another system (e.g., to replace another instance of a corresponding software component deployed within the other system). In some cases, the filter can even control whether the transactions involving the launched model will be subject to further monitoring and automated model generation. For instance, the filter can dictate that a model generated from a particular transaction satisfying a filter be launched in an environment, which is not (or only conditionally) monitored, among other examples.

Figure 7:
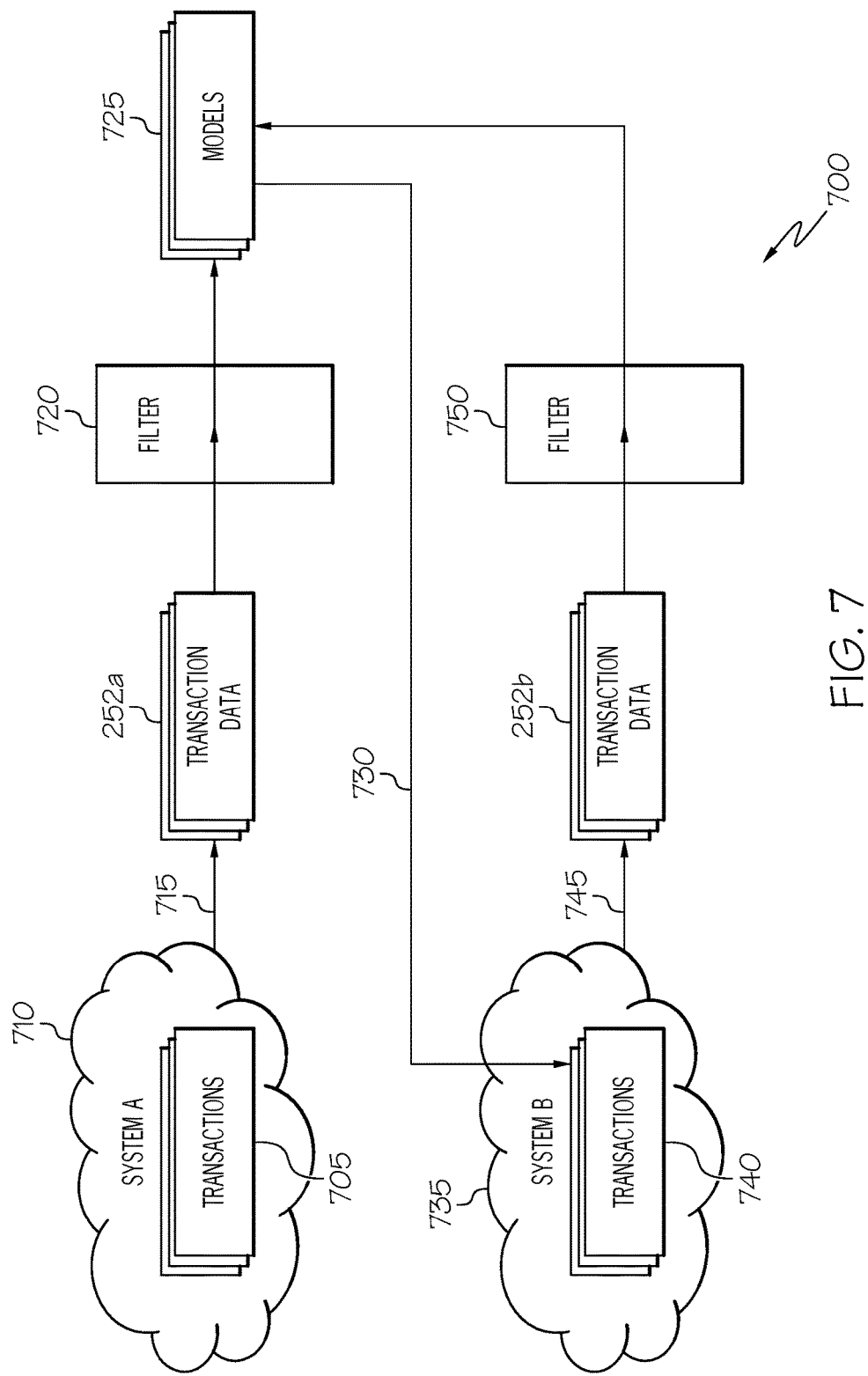
FIG. 7 is a simplified block diagram illustrating an example of the automated generation and launching of models from transaction data generated from monitoring of a system.

Turning to FIG. 7, a simplified flowchart 700 is presented illustrating an example of the automated generation and launching of software component models from transaction data generated from monitoring of a system. In this particular example, a variety of transactions 705 of various types (including multiple instances of the same type) may be performed in a system 710. Varying software components of the system 710 may participate in the constituent request-responses (or transaction fragments) of the transactions 705. One or more agents can be instrumented on a least a portion of the software components of the system 710 and can report characteristics of the transactions 705 as observed by the agents. Transaction data 252a can be generated 715 from the monitoring of the transactions 705 and can be assessed (e.g., by a filter manager or other component of a software development system) according to one or more transaction filters defined for the system. For instance, a particular filter 720 can be defined to identify a subset of the transactions (and transaction data 252a) that possess one or more attributes satisfying one or more criteria defined for the filter 720. Applying the filter can result in a subset of the transaction data being tagged or otherwise selected for access and use (e.g., by a model generator) to generate one or more models 725 to simulate behavior of one or more of the software components involved in the selected transactions. The models can be generated automatically in response to identifying transaction data corresponding to transactions determined to satisfy criteria of the filter 720.

Further, in the example of FIG. 7, a filter 720 can specify that the model 725 is to be launched 730 automatically, following its generation, within a target system (e.g., 735). The target system 735, in some cases, can be the same system (e.g., 710) in which the transactions (e.g., 705) were observed upon which the model 725 is based. In other cases, the model 725 can be launched in a separate system or version of the same system, among other examples. Indeed, instances of the model 725 can be launched in multiple different systems 735 (or versions of a system). In instances where a model is to be launched in a system (e.g., 735) different from the one (e.g., 710) on which it was based, a testing or development tool on the target system may receive instructions from another development system (e.g., hosting or managing the model 725) to provision and launch the model in the particular target system, among other examples.

Launching a model 725 within a target system 735 can also cause transactions 740 to be initiated in which the model 725 participates within the target system 735. Indeed, in the case of a test case model, launching the model 725 may itself generate the requests that initiate one or more of these transactions 740. Monitoring of these subsequent transactions 740 within the target system 735 may also be enabled and corresponding transaction data 252b can be generated 745 for transactions 740 within the system 735. This transaction data 252b can likewise be filtered according to one or more defined filters. For instance, a filter 750 can be applied to the transaction data 252b to determine whether the transaction data 252b should be used to generate additional models (e.g., 725). In one example, filter 750 can define the same or similar criteria as defined by filter 720, but additionally provide criteria to guard against duplicate models being generated. Accordingly, as transaction data 252b generated from monitored transactions (e.g., 740) involving the launched model are filtered, one or more of these transactions may be identified as exhibiting behavior different from what is modeled in an existing one of the models. Accordingly, the filter 750 can cause these additional models to also be automatically generated and added to a library of models. Identify differences in the behavior of a system during a transaction (such as subsequent instance of a previously detected transaction initiated by a test case model) can serve to identify whether and how one or more components have been changed since an original or earlier recorded instance of the transaction. Accordingly, continuous monitoring and filtering of transactions can allow changes to the system to be detected and corresponding additional models 725 to be generated (automatically, without further user involvement) to model these changes software components as they are detected, among other examples. Indeed, in some implementations, an update to a system can trigger the launching and use of a set of models developed from a previous version or release of the system (i.e., prior to the update), to test the updated system and identify opportunities to correct potential bugs within the update or even trigger self-healing processes for the system, among other examples.

Figure 8:
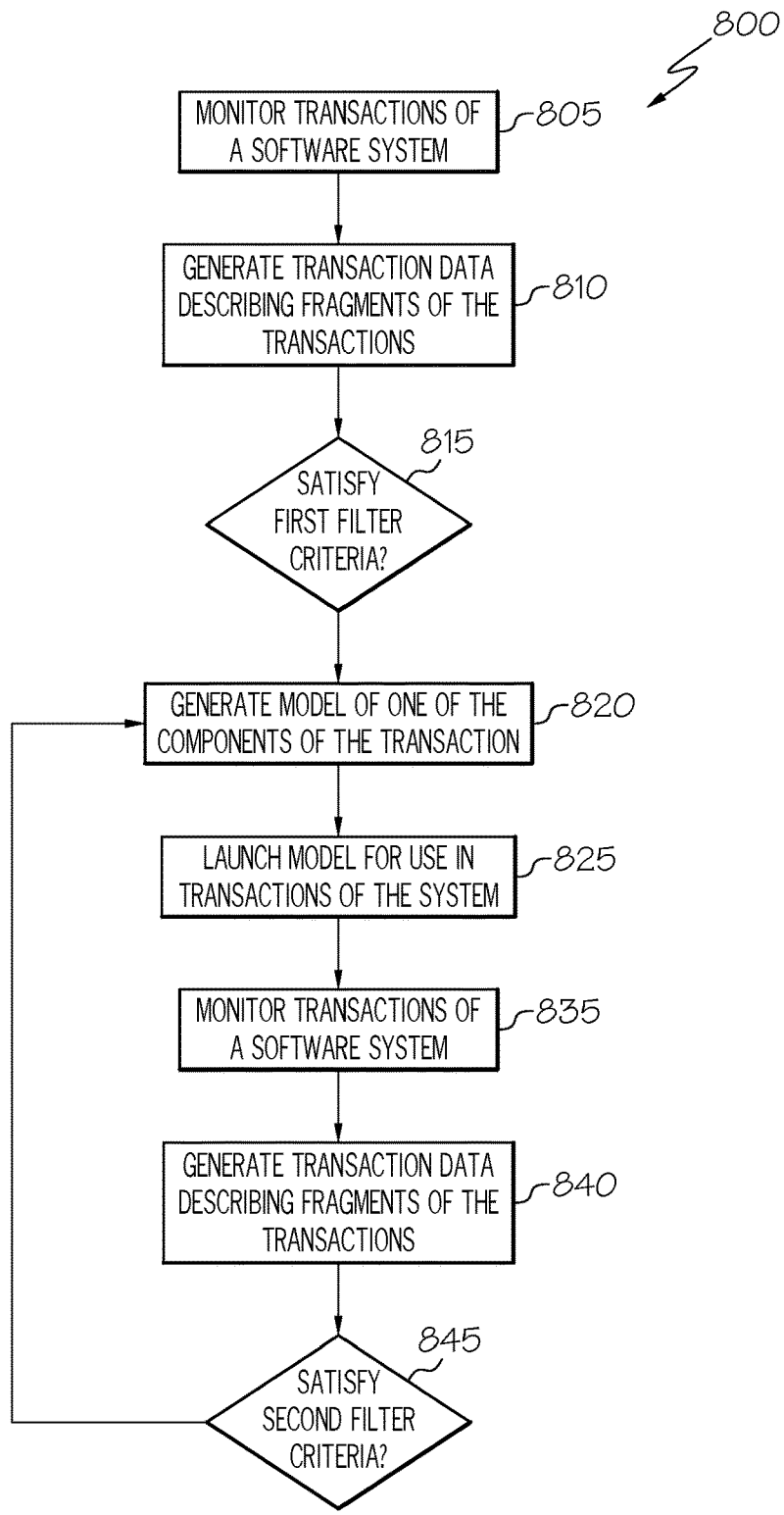
FIG. 8 is a simplified flowchart illustrating example techniques in connection with generation of models to simulate various components of a software system in accordance with at least one embodiment.

Turning to FIG. 8, a simplified flowchart 800 is presented illustrating example techniques for automating the generation of software component models for a system. For example, transactions of a system including multiple software components can be monitored 805 and transaction data can be generated describing content and characteristics of requests and responses sent between the software components in the transactions. A filter can be applied to transaction data to determine whether a transaction (or individual transaction fragment within the transaction) satisfies a first filter criteria (at 815) based on attributes of the transaction described in the transaction data. If the transaction does not (or if no fragment or transaction data describing the transaction) satisfy the criteria, the transaction can be assessed against other filters to determine if it meets other criteria of other filters. If a transaction is determined not to satisfy any of a set of defined filters for a system, the corresponding transaction data can simply be stored or archived (e.g., for further processing by in accordance with future filters defined for the system). In other instances, transaction data of transactions determined not to satisfy filter criteria can be removed from storage or deleted.

If it is determined that a particular transaction satisfies criteria of a first filter (at 615), a model can be automatically generated 820 to simulate behavior of at least one of the software components participating in the particular transaction. Transaction data corresponding to the transaction can be identified and at least a portion can be used to generate 820 the model. The model may be one of a virtual service model (to implement a virtual service) or a test case. The generated model can also be automatically launched 825 and participate in subsequent transactions of the system, the model standing-in in these transactions for the real version of the software component(s) whose operation is simulated by the model. These subsequent transactions can also be monitored 835 and corresponding transaction data generated 840. As with previous instances of these transactions (e.g., that utilized real version of the software components rather than the corresponding models), transaction data can be assessed to determine whether it satisfies second filter criteria (at 845). In some cases, second filter criteria can be based on safeguarding against multiple duplicate instances of particular model being generated from the continuous launching of a common type of transaction (e.g., according to the cycle described in the example of FIG. 6). In some cases, wholly different criteria and filters can be applied to transactions determined to include involvement of a model simulating one or more software components. Nonetheless, satisfying second filter criteria (at 845) can likewise result in the automatic generation (e.g., at 820) and launching (e.g., at 825) of additional models based on corresponding transaction data (e.g., generated at 840).

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   accessing transaction data generated from monitoring of a plurality of transactions in a system comprising a plurality of software components, wherein at least a particular one of the plurality of transactions comprises data generated by a particular model simulating operation of a particular one of the plurality of software components in the particular transaction;

analyzing the transaction data, using a data processing apparatus, to identify respective sets of attributes for each of the plurality of transactions;

determining, using the data processing apparatus, that the set of attributes of the particular transaction meets a particular one of a set of conditions, wherein the particular transaction involves a subset of the plurality of software components and the particular model;

selecting a portion of the transaction data describing the particular transaction based on the particular transaction meeting the particular condition;

determining that the set of attributes of another one of the plurality of transactions does not satisfy the particular condition, wherein the other transaction involves the subset of software components;

identifying another portion of the transaction data describing the other transaction; and autonomously generating an additional model of a another one of the subset of software components using the portion of the transaction data based on the particular transaction meeting the particular condition, wherein the other portion of the transaction data describing the other transaction is excluded from use in generation of the additional model based on the other transaction failing to meet the particular condition, and the additional model is used to launch a computer-implemented simulation of the other software components within subsequent transactions of the system.

2. The method of claim 1, wherein the particular model and the other model each respectively comprise one of a test case or a virtual service model.

3. The method of claim 2, wherein the test case simulates requests made by the particular software component.

4. The method of claim 3, wherein the test case further comprises a baseline to compare responses received to the simulated request to an expected response.

5. The method of claim 2, wherein the virtual service model is used to launch a virtual service to simulate responses of the particular software component to requests received in the particular transaction.

6. The method of claim 1, further comprising adding the additional model to a library of models.

7. The method of claim 1, further comprising launching the additional model for inclusion in the subsequent transactions, wherein the additional model is generated and launched automatically in response to identifying that the particular transaction meets the particular condition.

8. The method of claim 7, further comprising monitoring the subsequent transactions involving the additional model using one or more software-based agents, wherein the monitoring generates additional transaction data describing the subsequent transactions.

9. The method of claim 8, wherein the additional model comprises a test case to generate simulated requests to initiate the subsequent transactions, and the method further comprises determining whether the subsequent transactions differ from the particular transaction.

10. The method of claim 9, further comprising generating another model from the additional transaction data in response to determining that the subsequent transactions differ from the particular transaction.

11. The method of claim 9, further comprising determining a change to the system based on determining that the subsequent transactions differ from the particular transaction.

12. The method of claim 8, wherein the system comprises a particular system and the additional model is launched in transactions of another system.

13. The method of claim 12, further comprising comparing the transaction data with the additional transaction data to determine differences between the particular system and the other system.

14. The method of claim 1, wherein the condition corresponds to detecting that a transaction is initiated by a particular entity, wherein the entity comprises a particular user or group of users including the particular user.

15. The method of claim 14, wherein the attribute comprises a session identifier corresponding to the particular entity.

16. The method of claim 14, wherein the attribute comprises an address of a computing device associated with the particular entity included in a request within the particular transaction.

17. The method of claim 1, wherein the condition is further based on a value in content of a request or response within the transaction.

18. A non-transitory computer readable medium having program instructions stored therein, wherein the program instructions are executable by a computer system to perform operations comprising:

accessing transaction data generated from monitoring of a plurality of transactions in a system comprising a plurality of software components, wherein each of the transactions comprises transaction fragments, each transaction fragment comprises a respective request and response to the request, and at least a particular one of the plurality of transactions comprises data generated by a particular model simulating operation of a particular one of the plurality of software components in the particular transaction;

analyzing the transaction data, using a data processing apparatus, to identify respective sets of attributes for each of the plurality of transactions;

determining that the particular transaction meets a particular one of a set of conditions based on the set of attributes of the particular transaction, wherein the particular transaction involves a subset of the plurality of software components and the particular model;

selecting a portion of the transaction data describing the particular transaction based on the particular transaction meeting the particular condition;

determining that the set of attributes of another one of the plurality of transactions does not satisfy the particular condition, wherein the other transaction involves the subset of software components;

identifying another portion of the transaction data describing the other transaction;

automatically generating an additional model of a another one of the plurality of software components involved in the particular transaction in response to identifying that the particular transaction meets the particular condition, wherein the additional model is generated from the portion of the transaction data describing the particular transaction, and the other portion of the transaction data describing the other transaction is excluded from use in generation of the additional model based on the other transaction failing to meet the particular condition; and automatically launching of subsequent transactions involving the subset of software components utilizing the model in lieu of the other software component.

19. A system comprising:
a data processor;
a memory;
a filter manager executable by the data processor to:
- define a plurality of transaction filters, wherein each transaction filter defines a particular condition and an action to take based on the particular condition;
- access transaction data generated from monitoring of a plurality of transactions in a system comprising a plurality of software components, wherein each of the transactions comprises transaction fragments each transaction fragment comprises a respective request and response to the request, and at least a particular one of the plurality of transactions comprises data generated by a particular model simulating operation of a particular one of the plurality of software components in the particular transaction;
- identify, from the transaction data, that the particular transaction meets a particular condition of a particular one of the transaction filters, wherein the particular transaction is a transaction of a particular type, the action corresponding to the particular transaction filter comprises automatically generating an additional model of another one of the software components involved in transactions meeting the particular condition of the particular transaction filter;
- identify, from the transaction data, that another one of the plurality of transactions fails to meet the particular condition, wherein the other transaction is also of the particular type; and
- perform the action, wherein performing the action comprises generating model data comprising a portion of the transaction data, wherein the portion of the transaction data includes transaction data describing the particular transaction based on the particular transaction meeting the particular condition, and the model data excludes transaction data describing the other transaction based on the other transaction failing to meet the particular condition; and a model generator executable by the data processor to:
- autonomously generate the additional model, wherein the additional model is operable to simulate operation of the other software component involved in transactions of the particular type based on the indication.

20. The system of claim 19, further comprising a plurality of agents instrumented on at least a portion of the plurality of software components and operable to monitor the plurality of transactions, wherein the transaction data is generated based on the monitoring of the plurality of transactions by the plurality of agents.

\* \* \* \* \*